United States Patent
Evans et al.

(10) Patent No.: US 10,734,781 B2
(45) Date of Patent: Aug. 4, 2020

(54) IMPLANTED VACANCY CENTERS WITH COHERENT OPTICAL PROPERTIES

(71) Applicant: President and Fellows of Harvard College, Cambridge, MA (US)

(72) Inventors: Ruffin E. Evans, Somerville, MA (US); Alp Sipahigil, Cambridge, MA (US); Mikhail D. Lukin, Cambridge, MA (US)

(73) Assignee: President and Fellows of Harvard College, Cambridge, MA (US)

(*) Notice: Subject to any disclaimer, the term of this patent is extended or adjusted under 35 U.S.C. 154(b) by 0 days.

(21) Appl. No.: 15/775,366

(22) PCT Filed: Nov. 16, 2016

(86) PCT No.: PCT/US2016/062328
§ 371 (c)(1),
(2) Date: May 10, 2018

(87) PCT Pub. No.: WO2017/136015
PCT Pub. Date: Aug. 10, 2017

(65) Prior Publication Data
US 2018/0351323 A1 Dec. 6, 2018

Related U.S. Application Data

(60) Provisional application No. 62/256,058, filed on Nov. 16, 2015.

(51) Int. Cl.
*H01L 21/76* (2006.01)
*H01S 3/16* (2006.01)
(Continued)

(52) U.S. Cl.
CPC ............ *H01S 3/1681* (2013.01); *C09K 11/59* (2013.01); *C09K 11/66* (2013.01); *H01S 3/063* (2013.01);
(Continued)

(58) Field of Classification Search
CPC ........ H01S 3/1681; H01S 3/169; H01S 3/163; H01S 3/063; H01S 3/0941; C09K 11/66; C09K 11/59; G01N 21/9505
(Continued)

(56) References Cited

U.S. PATENT DOCUMENTS

| | | | |
|---|---|---|---|
| 2014/0291490 A1* | 10/2014 | Hanson | B82Y 10/00 250/214 R |
| 2015/0238125 A1* | 8/2015 | Acosta | A61B 5/0075 600/310 |
| 2015/0299894 A1* | 10/2015 | Markham | C30B 29/04 250/458.1 |

OTHER PUBLICATIONS

Chunlang Wang, "Single photon emission from SiV centres in diamond produced by ion implantation", J. Phys. B: At. Mol. Opt. Phys. 39 (2006) 37-41 (Year: 2006).*
(Continued)

*Primary Examiner* — Vu A Vu
(74) *Attorney, Agent, or Firm* — Wilmer Cutler Pickering Hale and Dorr LLP

(57) ABSTRACT

In an exemplary embodiment, a structure comprises a plurality of deterministically positioned optically active defects, wherein each of the plurality of deterministically positioned optically active defects has a linewidth within a factor of one hundred of a lifetime limited linewidth of optical transitions of the plurality of deterministically positioned optically active defects, and wherein the plurality of deterministically positioned optically active defects has an inhomogeneous distribution of wavelengths, wherein at least half of the plurality of deterministically positioned optically active
(Continued)

defects have transition wavelengths within a less than 8 nm range. In a further exemplary embodiment, method of producing at least one optically active defect comprises deterministically implanting at least one ion in a structure using a focused ion beam; heating the structure in a vacuum at a first temperature to create at least one optically active defect; and heating the structure in the vacuum at a second temperature to remove a plurality of other defects in the structure, wherein the second temperature is higher than the first temperature.

48 Claims, 19 Drawing Sheets

(51) Int. Cl.
| | | |
|---|---|---|
| C09K 11/59 | (2006.01) | |
| C09K 11/66 | (2006.01) | |
| H01S 3/063 | (2006.01) | |
| H01S 3/0941 | (2006.01) | |
| G01N 21/95 | (2006.01) | |

(52) U.S. Cl.
CPC ............ *H01S 3/0941* (2013.01); *H01S 3/163* (2013.01); *H01S 3/169* (2013.01); *G01N 21/9505* (2013.01)

(58) Field of Classification Search
USPC .......................................... 438/407
See application file for complete search history.

(56) References Cited

OTHER PUBLICATIONS

D'Haenens-Johansson et al., "Optical properties of the neutral silicon split-vacancy center in diamond", Physical Review B, Dec. 15, 2011, vol. 84, Issue 24, pp. 245208-1 to 245208-14.

Edmonds et al., "Electron paramagnetic resonance studies of silicon-related defects in diamond", Physical Review B, Jun. 15, 2008, vol. 77, Issue 24, pp. 245205-1 to 245205-11.

Evans et al., "Coherent optical emitters in diamond nanostructures via ion implantation", [online] arXiv: 1512.03820v1 [cond-mat.mes-hall], Dec. 11, 2015, 8 pages, retrieved from (https://arxiv.org//pdf/1512.03820v1.pdf).

Gali et al., "Ab initio study of the split silicon-vacancy defect in diamond: Electronic structure and related properties", Physical Review B, Dec. 15, 2013, vol. 88, Issue 23, pp. 235205-1 to 235205-7.

Goss et al., "The Twelve-Line 1.682 eV Luminescence Center in Diamond and the Vacancy-Silicon Complex", Physical Review Letters, Sep. 30, 1996, vol. 77, Issue 14, pp. 3041-3044.

International Search Report and Written Opinion dated Sep. 1, 2017 in International Application No. PCT/US16/62328, filed Nov. 16, 2016, 16 pages.

Jahnke et al., "Electron-phonon processes of the silicon-vacancy centre in diamond", New Journal of Physics, Apr. 8, 2015, vol. 17, 043011, pp. 1-11.

Mueller et al., "Optical signatures of silicon-vacancy spins in diamond", Nature Communications Feb. 18, 2014, vol. 5:3328, pp. 1-7.

Neu et al., "Single photon emission from silicon-vacancy colour centres in chemical vapour deposition nano-diamonds on iridium", New Journal of Physics, Feb. 21, 2011, vol. 13, 025012, pp. 1-21.

Rogers et al., "Electronic structure of the negatively charged silicon-vacancy center in diamond", Physical Review B, Jun. 15, 2014, vol. 89, Issue 23, pp. 235101-1 to 235101-8.

Rogers et al., "Multiple intrinsically identical single-photon emitters in the solid state", Nature Communications, Aug. 27, 2014, vol. 5:4739, pp. 1-6.

Sipahigil et al., "Indistinguishable Photons from Separated Silicon-Vacancy Centers in Diamond", Physical Review Letters, Sep. 12, 2014, vol. 113, pp. 113602-1 to 113602-5.

Sternschulte et al., "1.681-eV luminescence center in chemical-vapor-deposited homoepitaxial diamond films", Physical Review B, Nov. 15, 1994, vol. 50, No. 19, 14554-14560.

Wang et al., "Single photon emission from SiV centres in diamond produced by ion implantation", Journal of Physics B: Atomic Molecular and Optical Physics, vol. 39, pp. 37-41, Dec. 5, 2005.

\* cited by examiner

IMPLANTED VACANCY CENTERS WITH COHERENT OPTICAL PROPERTIES

CROSS-REFERENCE TO RELATED APPLICATIONS

This application is a national stage application of International Application No. PCT/US16/62328 filed on Nov. 16, 2016 which claims the benefit of priority to U.S. Provisional Patent Application No. 62/256,058, entitled "Implanted Silicon-Vacancy Centers with Coherent Optical Properties," filed on Nov. 16, 2015, the disclosure of which is incorporated herein in its entirety by reference thereto.

STATEMENT REGARDING FEDERALLY SPONSORED RESEARCH OR DEVELOPMENT

This invention was made with government support under PHY-1506284 and PHY-1125846 awarded by the National Science Foundation, Grant No. FA9550-12-1-0025 awarded by the Air Force Office of Strategic Research, Grant No. W911NF1520067 awarded by the Army Research Laboratory, and Grant No. W31P4Q-12-1-0017 awarded by DARPA. The Government has certain rights in the invention.

INCORPORATION BY REFERENCE

All patents, patent applications and publications cited herein are hereby incorporated by reference in their entirety in order to more fully describe the state of the art as known to those skilled therein as of the date of the disclosure described herein.

TECHNICAL FIELD

This technology relates generally to optically active defects with coherent optical and other properties. In particular, exemplary embodiments relate to silicon-vacancy and/or germanium-vacancy centers in nanostructures and other structures and methods of producing such materials.

BACKGROUND

Coherent quantum emitters are a basic ingredient in many quantum information systems. Atom-like emitters in the solid state represent a promising platform that can be scalably integrated into nanophotonic devices. However, no single system has yet combined high brightness of narrowband emission and a low inhomogeneous distribution of photon frequencies from separate emitters (indistinguishability) with ease of incorporation into nanophotonic structures. For example, semiconductor quantum dots can be bright and simple to integrate into nanostructures, but have a notoriously large inhomogeneous distribution. Nitrogen-vacancy ($NV^-$) centers in bulk diamond are bright and photostable, with a moderate inhomogeneous distribution that allows straightforward tuning of multiple $NV^-$ centers into resonance. These properties allow proof-of-principle demonstrations of quantum information protocols such as remote spin-spin entanglement generation and quantum teleportation. Further progress towards developing $NV^-$ based quantum devices has been hindered by low indistinguishable photon generation rates, a challenge that could be addressed by integrating $NV^-$ centers into nanophotonic structures. However, the optical transition frequencies of $NV^-$ centers are very sensitive to their local environment, making integration of spectrally stable emitters into nanophotonic structures a major challenge.

The negatively charged silicon-vacancy color center in diamond ($SiV^-$) has shown promise in fulfilling the key criteria of high brightness, lifetime-limited optical linewidths, and a narrow inhomogeneous distribution of optical transition frequencies. The $SiV^-$ (FIG. 1) has electronic states with strong dipole transitions (excited state lifetime of under 1.7 ns) with 70% of the emission in the zero-phonon line (ZPL) at 737 nm. The inversion symmetry of the $SiV^-$ prevents first-order Stark shifts, suppressing spectral diffusion and allowing indistinguishable photons to be generated from separate emitters without the need for tuning or extensive pre-selection of emitters. When combined with a spin degree of freedom, the $SiV^-$ center's bright narrowband transition, narrow inhomogeneous distribution, and spectral stability make it a promising candidate for applications in quantum information science.

The negatively-charged germanium-vacancy color center in diamond ($GeV^-$) is another promising color center with many of the same properties as the $SiV^-$. It also has a bright, narrowband optical transition that is protected from Stark shifts and environmental inhomogeneities by inversion symmetry.

These color centers occur only rarely in nature, and are typically introduced during CVD growth via deliberate doping with silane ($SiV^-$ centers) or via Si/Ge contamination. While these techniques typically result in a narrow inhomogeneous distribution of color center fluorescence wavelengths, these samples have a number of disadvantages: the concentration of color centers is difficult to control, localization of color centers in three dimensions is impossible, and such samples cannot generally be obtained commercially.

Both the SiV and GeV color centers in diamond also exist in neutral charge states. The ground electronic states of these $SiV^0$ and $GeV^0$ color centers are believed to be orbital singlet states, leading to long spin coherence times even at room temperature. These neutral charge states are predicted to have high-quality optical properties again due to the inversion symmetry of the defect structure, and can also be created using ion implantation, either alone or with the addition of extra dopants or local gates to control the diamond Femi level.

SUMMARY OF EXEMPLARY EMBODIMENTS

In one aspect, implanted $SiV^-$ centers present bright optical emission with a narrow inhomogeneous distribution of $SiV^-$ optical transition wavelengths and nearly lifetime-limited optical linewidths. These properties persist after nanofabrication, making the $SiV^-$ center uniquely suited for integration into quantum nano-optical devices. In one or more embodiments, the implanted $SiV^-$ centers can be scalably integrated into nanowire single photon sources or nanocavities. The processing procedure with targeted implantation of silicon using a focused ion beam improves photonic device yields and reproducibility by deterministically placing individual $SiV^-$ centers at well-defined positions in all three dimensions, making the $SiV^-$ center a promising new component in solid-state quantum optics.

In one aspect, implanted $GeV^-$ centers present bright optical emission with a narrow inhomogeneous distribution of $GeV^-$ optical transition wavelengths and nearly lifetime-limited optical linewidths. These properties persist after nanofabrication, making the $GeV^-$ center uniquely suited for integration into quantum nano-optical devices. In one or more embodiments, the implanted GeV⁻ centers can be scalably integrated into nanowire single photon sources or nanocavities. The processing procedure with targeted implantation of silicon using a focused ion beam improves photonic device yields and reproducibility by deterministically placing individual GeV⁻ centers at well-defined positions in all three dimensions, making the GeV⁻ center a promising new component in solid-state quantum optics.

In one or more exemplary embodiments, a structure comprises a plurality of deterministically positioned optically active defects, wherein each of the plurality of deterministically positioned optically active defects has a linewidth within a factor of one hundred of a lifetime limited linewidth of optical transitions of the plurality of deterministically positioned optically active defects, and wherein the plurality of deterministically positioned optically active defects has an inhomogeneous distribution of wavelengths, wherein at least half of the plurality of deterministically positioned optically active defects have transition wavelengths within a less than 8 nm range.

In one or more exemplary embodiments, the structure comprises a diamond structure in which the plurality of deterministically positioned optically active defects are located. In one or more exemplary embodiments, the plurality of deterministically positioned optically active defects comprise a plurality of atom-vacancy centers. In one or more exemplary embodiments, the plurality of deterministically positioned optically active defects comprise a plurality of deterministically positioned SiV⁻ centers. In one or more exemplary embodiments, the narrow linewidths are within a factor of five of the lifetime limited linewidth of optical transitions of the plurality of deterministically positioned optically active defects (e.g., atom-vacancy centers such as SiV⁻ centers). In one or more exemplary embodiments, the full-width at half-maximum of the plurality of deterministically positioned optically active defects (e.g., atom-vacancy centers such as SiV⁻ centers) is in the range of 90 to 2500 MHz. In one or more exemplary embodiments, the full-width at half-maximum of the plurality of deterministically positioned optically active defects (e.g., atom-vacancy centers such as SiV⁻ centers) is in the range of 150 to 870 MHz. In one or more exemplary embodiments, the full-width at half-maximum of the plurality of deterministically positioned optically active defects (e.g., atom-vacancy centers such as SiV⁻ centers) is about 510 MHz. In one or more exemplary embodiments, the full-width at half-maximum of the plurality of deterministically positioned optically active defects (e.g., atom-vacancy centers such as SiV⁻ centers) is in the range of 170 to 530 MHz. In one or more exemplary embodiments, the full-width at half-maximum of the plurality of deterministically positioned optically active defects (e.g., atom-vacancy centers such as SiV⁻ centers) is about 350 MHz.

In one or more exemplary embodiments, the structure comprises a diamond structure in which the plurality of deterministically positioned optically active defects are located. In one or more exemplary embodiments, the plurality of deterministically positioned optically active defects comprise a plurality of atom-vacancy centers. In one or more exemplary embodiments, the plurality of deterministically positioned optically active defects comprise a plurality of deterministically positioned GeV⁻ centers. In one or more exemplary embodiments, the narrow linewidths are within a factor of five of the lifetime limited linewidth of optical transitions of the plurality of deterministically positioned optically active defects (e.g., atom-vacancy centers such as GeV⁻ centers). In one or more exemplary embodiments, the full-width at half-maximum of the plurality of deterministically positioned optically active defects (e.g., atom-vacancy centers such as GeV⁻ centers) is in the range of 30 to 2500 MHz. In one or more exemplary embodiments, the full-width at half-maximum of the plurality of deterministically positioned optically active defects (e.g., atom-vacancy centers such as GeV⁻ centers) is in the range of 70 to 870 MHz. In one or more exemplary embodiments, the full-width at half-maximum of the plurality of deterministically positioned optically active defects (e.g., atom-vacancy centers such as GeV⁻ centers) is in the range of 170 to 530 MHz. In one or more exemplary embodiments, the full-width at half-maximum of the plurality of deterministically positioned optically active defects (e.g., atom-vacancy centers such as GeV⁻ centers) is about 70 MHz.

In one or more exemplary embodiments, at least half of the plurality of deterministically positioned optically active defects (e.g., atom-vacancy centers such as SiV⁻ or GeV⁻ centers) have transition wavelengths within a 4 nm range. In one or more exemplary embodiments, at least half of the plurality of deterministically positioned optically active defects (e.g., atom-vacancy centers such as SiV⁻ or GeV⁻ centers) have transition wavelengths within a 3 nm range. In one or more exemplary embodiments, at least half of the plurality of deterministically positioned optically active defects (e.g., atom-vacancy centers such as SiV⁻ or GeV⁻ centers) have transition wavelengths within a 0.1 nm range. In one or more exemplary embodiments, at least half of the plurality of deterministically positioned optically active defects (e.g., atom-vacancy centers such as SiV⁻ or GeV⁻ centers) have transition wavelengths within a 0.05 nm. In one or more exemplary embodiments, at least half of the plurality of deterministically positioned optically active defects (e.g., atom-vacancy centers such as SiV⁻ or GeV⁻ centers) have transition wavelengths within a 0.03 nm range. In one or more exemplary embodiments, the plurality of deterministically positioned optically active defects has an isotopic purity greater than a natural abundance of 37%. In one or more exemplary embodiments, the plurality of deterministically positioned optically active defects has an isotopic purity greater than a natural abundance of 92%.

In one or more exemplary embodiments, a method of producing at least one optically active defect comprises deterministically implanting at least one ion in a structure using a focused ion beam; heating the structure in a vacuum at a first temperature to create at least one optically active defect; and heating the structure in the vacuum at a second temperature to remove a plurality of other defects in the structure, wherein the second temperature is higher than the first temperature.

In one or more exemplary embodiments, the at least one optically active defect is at least one atom-vacancy center. In one or more exemplary embodiments, the at one least optically active defect is an SiV⁻ center. In one or more exemplary embodiments, the at one least optically active defect is an GeV⁻ center. In one or more exemplary embodiments, the structure is diamond. In one or more exemplary embodiments, the structure comprises a surface having less than 100 nm RMS roughness into which the at least one ion is implanted. In one or more exemplary embodiments, the structure comprises a surface having less than 10 nm RMS roughness into which the at least one ion is implanted. In one or more exemplary embodiments, the surface (e.g., having less than 100 RMS roughness or less than 10 RMS roughness) is produced through plasma etching. In one or more exemplary embodiments, the structure comprises a previously fabricated device. In one or more exemplary embodiments, the structure comprises at least one of an electrical device, an optical device, a micro-structured device, or a nano-structured device. In one or more exemplary embodiments, deterministically implanting at least one ion in a structure using a focused ion beam comprises at least one of determining a number of implanted ions, determining a depth of implantation of the at least one ion, or determining a location of implantation of the at least one ion. In one or more exemplary embodiments, the pressure in the vacuum is less than $10^{-5}$ Torr. In one or more exemplary embodiments, the pressure in the vacuum is in the range of $10^{-6}$ to $10^{-10}$ Torr. In one or more exemplary embodiments, the first temperature is 600° C. to 1000° C. In one or more exemplary embodiments, the first temperature is about 800° C. In one or more exemplary embodiments, the second temperature is above 1000° C. In one or more exemplary embodiments, the second temperature is 1000° C. to 1600° C. In one or more exemplary embodiments, the second temperature is about 1200° C.

These and other aspects and embodiments of the disclosure are illustrated and described below.

BRIEF DESCRIPTION OF THE DRAWINGS

Exemplary embodiments are described with reference to the following figures, which are presented for the purpose of illustration only and are not intended to be limiting.

In the Drawings:

FIG. 2a shows a Kernel density estimation of distribution of bulk SiV$^-$ wavelengths after 800° C. (19 emitters, orange curve) and 1100° C. (13 emitters, transition C, blue curve) annealing. The distribution narrows from 3-4 nm (800° C. anneal) to 0.03 nm (15 GHz) (1100° C.). FIG. 2b shows a distribution (transition C) after 1100° C. anneal. FIGS. 2c-2d show spatial maps of collected fluorescence (thousands of counts per second) over a region of bulk diamond exciting off (c) and on (d) resonance. By comparing the densities of emitters, it is estimated that 30±15% of the emitters have the same resonance frequency. These measurements were taken at 9-15 K.

FIG. 3a shows a scanning electron micrograph of six nanobeam waveguides. Inset: schematic of triangular diamond nanobeam containing SiV$^-$ center. FIG. 3b is a spatial map of ZPL fluorescence collected by scanning confocal microscopy with off-resonant excitation. Multiple bright SiV$^-$ centers are visible in each waveguide. FIG. 3c is a linewidth of representative single SiV$^-$ inside a nano-waveguide measured by PLE spectroscopy. Typical linewidths for bulk emitters are 350±180 MHz (ensemble average for N=13 emitters) and for waveguide emitters 510±360 MHz (N=11).

FIG. 3d shows a spectral diffusion of the emitter measured in FIG. 3c. The total spectral diffusion is under 500 MHz even after 90 minutes of continuous measurement. Error bars are statistical error on the fitted center position. Lighter outline is the FWHM of the fitted lorentzian at each time point.

DETAILED DESCRIPTION OF EXEMPLARY EMBODIMENTS

Figure 1A:
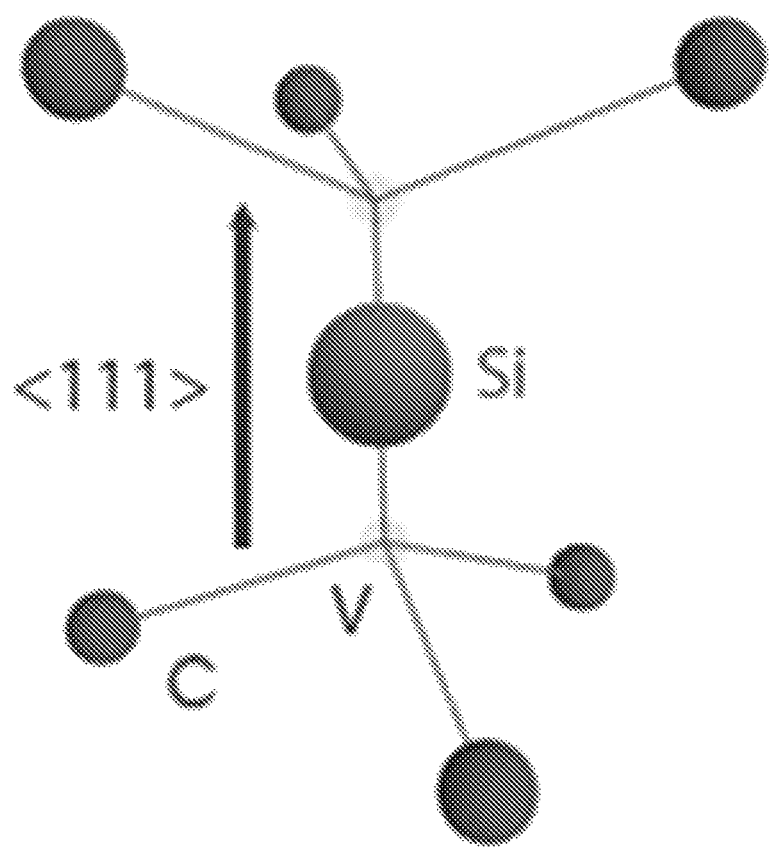
FIG. 1a shows an atomic structure of the SiV$^-$ center. The V-Si-V axis lies along the <111> lattice direction. The SiV$^-$ has $D_{3d}$ symmetry. The same structure applies to the GeV if the silicon atom is replaced by a Germanium atom.

The negatively-charged silicon-vacancy (SiV$^-$) and germanium-vacancy (GeV$^-$) centers in diamond are bright sources of indistinguishable single photons and hence useful resources in quantum information protocols. Until now, such color centers with narrow optical linewidths and inhomogeneous distributions of transition frequencies have only been reported in samples doped with silicon or germanium during diamond growth. The inventors present a technique for producing implanted SiV$^-$ and GeV$^-$ centers with nearly lifetime-limited optical linewidths and a small inhomogeneous distribution. These properties persist after nanofabrication, paving the way for incorporation of high-quality color centers into nanophotonic devices.

Ion implantation offers a promising solution to the problems described above. By controlling the energy, quantity, and isotopic purity of the source ions, the depth, concentration, and isotope of the resulting implanted ions can be controlled. Ion implantation is widely commercially available. Targeted ion implantation using a focused silicon ion beam is also possible, allowing for placement of silicon defects in all three dimensions with precision on the scale of tens of nanometers. However, studies of implanted SiV− centers have generally reported broad inhomogeneous fluorescence linewidths of 8-10 nm and conflicting results on SiV$^-$ brightness and yields. GeV$^-$ has the additional benefit of a high radiative quantum efficiency due to its higher-frequency optical transition (ZPL at 602 nm) and relative difficulty of phonon-assisted (nonradiative) decay at this energy. These two criteria of a low inhomogeneous distribution relative to the single-emitter linewidth and narrow single-emitter linewidth relative to the lifetime limit of 94 MHz are essential for quantum optics applications.

In one aspect, SiV$^-$ and GeV$^-$ centers in diamond are created using ion implantation. Implantation is followed by a high-temperature high-vacuum anneal to facilitate color center formation and repair implantation-induced damage to the lattice. The resulting emitters have narrow optical transitions within a factor of five of the lifetime limited linewidth and a narrow inhomogeneous distribution such that the half of the emitters have transitions that lie in a 15 GHz window. Finally, these SiV$^-$ and GeV$^-$ centers are incorporated into nanostructures and demonstrate that their favorable optical properties are maintained even after fabrication.

In an exemplary embodiment, optically active defects (e.g., atom-vacancy centers such SiV$^-$ or GeV$^-$ centers) are implanted in a structure such as a diamond through the following process. First, an etching step is performed to remove a top layer of the diamond and create a smooth surface. For example, the etching can be performed in a plasma etching chamber. Second, a focused ion beam (FIB) is used to implant ions in the structure. For example, Si or Ge ions can be implanted in a structure such as a smooth surface of an etched synthetic diamond. The number of ions implanted in the structure can be deterministically controlled. Additionally, the depth of implantation and the location of the ions can be deterministically controlled. For example, the depth can be in the range of 0 to 10 µm and the positioning can be controlled with a resolution of 10 to 50 nm or less. The use of a focused ion beam can, for example, provide resolution of tens of nanometers or less. Third, a vacuum annealing process is used to create atom-vacancy centers such as SiV$^-$ or GeV$^-$ centers in the structure. The structure is placed in a vacuum chamber with a pressure of less than $10^{-5}$ Torr, e.g., in the range of $10^{-6}$ to $10^{-10}$ Torr, and more particularly in the range of about $10^{-6}$ to $10^{-7}$ Torr. The structure is then heated through a multi-step processes. This multi-step annealing processing causes the implanted ions to relax and form vacancy centers and repairs defects in the structure.

In particular, during the annealing process of this exemplary embodiment, the temperature in the chamber is first raised to 600° C. to 1000° C. For example, the temperature can be raised to about 800° C. The chamber temperature is then maintained for a period of time. For example, the temperature can be maintained for about 8 hours, although other durations can also be used. For example, the temperature could be maintained for 4-12 hours or for some other duration. The first temperature in this multi-step annealing process causes the implanted ions to form vacancy centers. Next, the temperature is raised to above 1000° C. For example, the temperature can be raised to 1000° C. to 1600° C. For example, the temperature can be raised to 1200° C. The higher temperature removes defects from the structures. This in turn improves electronic purity and decreases strain in the structure. Additionally, this additional heating step results in improved optical properties for the atom-vacancy centers, such as a low inhomogeneous distribution relative to the single-emitter linewidth and narrow a single-emitter linewidth.

In an additional exemplary embodiment, the techniques described herein can be used to produce a structure such as diamond, a previously fabricated device, an electrical device, an optical device, a micro-structured device, or a nano-structured device comprising one or more deterministically positioned optically active defects, for example, atom-vacancy centers such as SiV$^-$ centers. The atom-vacancy centers have a narrow linewidth and a narrow an inhomogeneous distribution of wavelengths, which are desirable optical properties. For example, the structure can comprise plurality of deterministically positioned SiV$^-$ centers, wherein each of the plurality of deterministically positioned SiV$^-$ centers has a linewidth within a factor of one hundred of the lifetime limited linewidth of optical transitions of the plurality of deterministically positioned SiV$^-$ centers. Additionally, the plurality of deterministically positioned SiV$^-$ centers has an inhomogeneous distribution of wavelengths, wherein at least half of the plurality of deterministically positioned SiV$^-$ centers have transition wavelengths within a less than 8 nm range.

In an additional exemplary embodiment, the techniques described herein can be used to produce a structure such as diamond, a previously fabricated device, an electrical device, an optical device, a micro-structured device, or a nano-structured device comprising one or more deterministically positioned optically active defects, for example, atom-vacancy centers such as GeV$^-$ centers. The atom-vacancy centers have a narrow linewidth and a narrow an inhomogeneous distribution of wavelengths, which are desirable optical properties. For example, the structure can comprise plurality of deterministically positioned GeV$^-$ centers, wherein each of the plurality of deterministically positioned GeV$^-$ centers has a linewidth within a factor of one hundred of the lifetime limited linewidth of optical transitions of the plurality of deterministically positioned GeV$^-$ centers. Additionally, the plurality of deterministically positioned GeV$^-$ centers has an inhomogeneous distribution of wavelengths, wherein at least half of the plurality of deterministically positioned GeV$^-$ centers have transition wavelengths within a less than 8 nm range.

In further exemplary embodiments, the narrow linewidths can be within a factor of five of a lifetime limited linewidth of optical transitions of the plurality of deterministically positioned SiV$^-$ centers. In one or more exemplary embodiments, the full-width at half-maximum of the plurality of deterministically positioned SiV$^-$ centers is in the range of 90 to 2500 MHz. Additionally, the full-width at half-maximum of the plurality of deterministically positioned SiV⁻ centers is in the range of 150 to 870 MHz. For example, the full-width at half-maximum of the plurality of deterministically positioned SiV⁻ centers can be about 510 MHz. In further exemplary embodiments, the full-width at half-maximum of the plurality of deterministically positioned SiV⁻ centers can be in the range of 170 to 530 MHz. For example, the full-width at half-maximum of the plurality of deterministically positioned SiV⁻ centers can be about 350 MHz. Additionally, in an exemplary embodiment, the narrow linewidths of the deterministically positioned SiV⁻ centers can be single fluorescent wavelengths.

In further exemplary embodiments, the narrow linewidths can be within a factor of five of a lifetime limited linewidth of optical transitions of the plurality of deterministically positioned GeV⁻ centers. In one or more exemplary embodiments, the full-width at half-maximum of the plurality of deterministically positioned GeV⁻ centers is in the range of 30 to 2500 MHz. Additionally, the full-width at half-maximum of the plurality of deterministically positioned GeV⁻ centers is in the range of 150 to 870 MHz. For example, the full-width at half-maximum of the plurality of deterministically positioned GeV⁻ centers can be about 510 MHz. In further exemplary embodiments, the full-width at half-maximum of the plurality of deterministically positioned GeV⁻ centers can be in the range of 170 to 530 MHz. For example, the full-width at half-maximum of the plurality of deterministically positioned GeV⁻ centers can be about 350 MHz. Additionally, in an exemplary embodiment, the narrow linewidths of the deterministically positioned GeV⁻ centers can be single fluorescent wavelengths.

In further exemplary embodiments, at least half of the plurality of deterministically positioned color centers such as SiV⁻ centers have transition wavelengths within a 3-4 nm range. In an exemplary embodiment, the multi-step annealing process can be used to narrow the range of the distribution. For example, in an exemplary embodiment, the structure can have at least half of the plurality of deterministically positioned SiV⁻ centers have transition wavelengths within a 0.1 nm range. In a further exemplary embodiment, at least half of the plurality of deterministically positioned SiV⁻ centers have transition wavelengths within a 0.05 nm. And in still a further exemplary embodiment, at least half of the plurality of deterministically positioned SiV⁻ centers have transition wavelengths within a 0.03 nm range. Thus, in one or more exemplary embodiments, the structures produced by the methods described herein have desirable optical properties such as deterministically positioned atom-vacancy centers with narrow a single-emitter linewidth and with a low inhomogeneous distribution relative to the single-emitter linewidth.

In further exemplary embodiments, at least half of the plurality of deterministically positioned color centers such as GeV⁻ centers have transition wavelengths within a 3-4 nm range. In an exemplary embodiment, the multi-step annealing process can be used to narrow the range of the distribution. For example, in an exemplary embodiment, the structure can have at least half of the plurality of deterministically positioned GeV⁻ centers have transition wavelengths within a 0.1 nm range. In a further exemplary embodiment, at least half of the plurality of deterministically positioned GeV⁻ centers have transition wavelengths within a 0.05 nm. And in still a further exemplary embodiment, at least half of the plurality of deterministically positioned GeV⁻ centers have transition wavelengths within a 0.03 nm range. Thus, in one or more exemplary embodiments, the structures produced by the methods described herein have desirable optical properties such as deterministically positioned atom-vacancy centers with narrow a single-emitter linewidth and with a low inhomogeneous distribution relative to the single-emitter linewidth.

These and other exemplary embodiments are described further in the sections of the detailed description that follow.

The SiV⁻ Center in Diamond

The silicon-vacancy color center is a point defect in diamond wherein a silicon atom occupies an interstitial position between two vacancies (FIG. 1a). The SiV⁻ is a spin-½ system with ground ($^2E_g$) and excited ($^2E_u$) states localized to the diamond bandgap. Both states have double spin and orbital degeneracies partially lifted by the spin-orbit interaction (FIG. 1b) which splits each quartet into two degenerate doublets. The spin-orbit splittings for the ground and excited states are 0.19 and 1.08 meV (47 and 260 GHz), respectively (FIG. 1c). All transitions between the ground and excited states are dipole-allowed with a ZPL energy of 1.68 eV (λ=737 nm). The GeV⁻ center has the same level structure but with spin-orbit splittings of 170 GHz in the ground state and 1000 GHz in the excited state, with a ZPL energy of 2.06 eV (λ=602 nm)

Figure 1B:
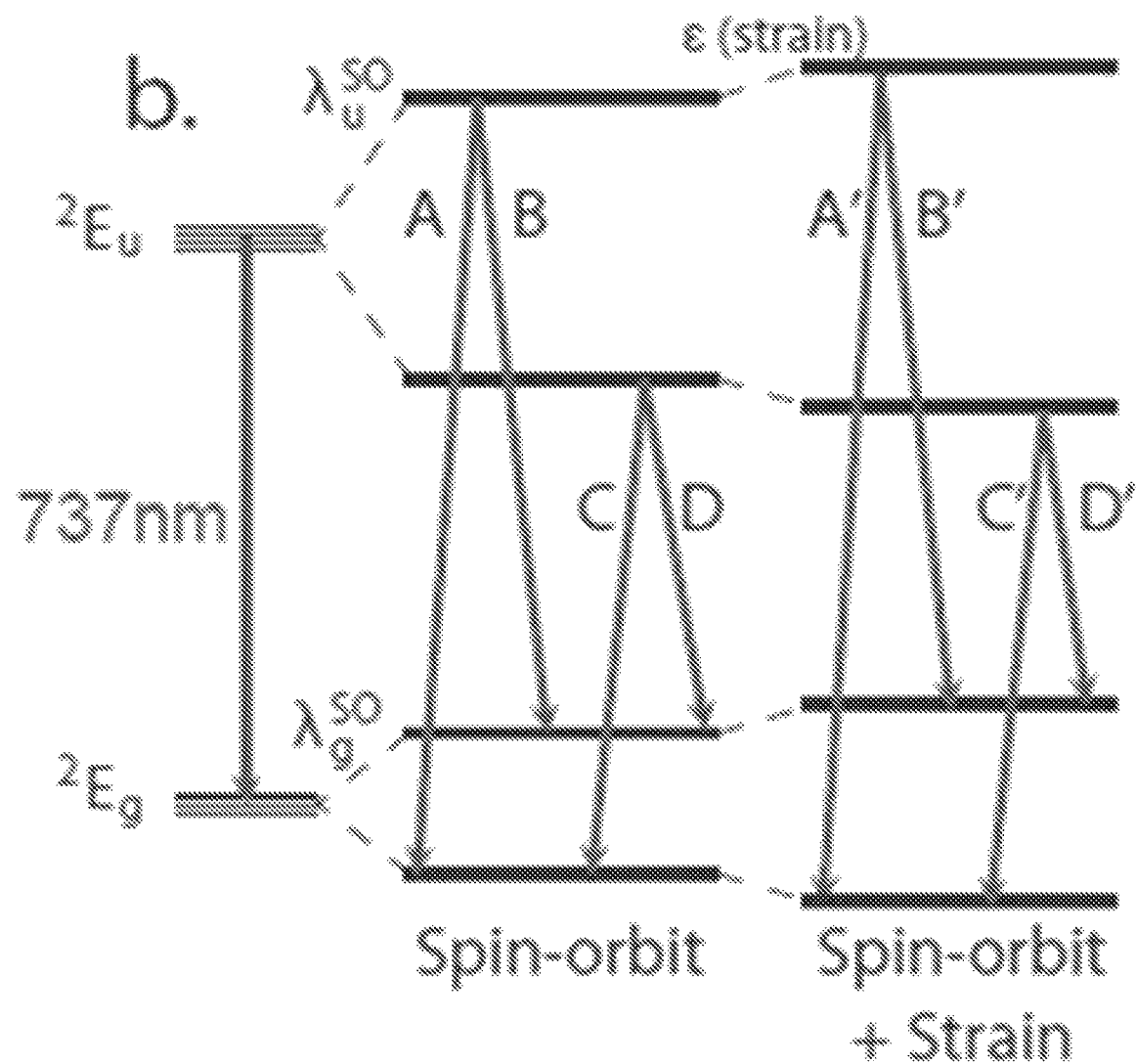
FIG. 1b shows a level structure of the SiV$^-$ center. The SiV$^-$ is a single-hole system with double orbital and spin degeneracy. This degeneracy is partially lifted by spin-orbit coupling ($\lambda_g^{SO}$=50 GHz and $\lambda_u^{SO}$=260 GHz). Lattice strain increases the splitting between these spin-orbit levels, shifting the transition frequencies. The GeV$^-$ level structure is identical, but with spin-orbit energies of approximately 170 and 1000 GHz for the ground and excited state, respectively.
Figure 1C:
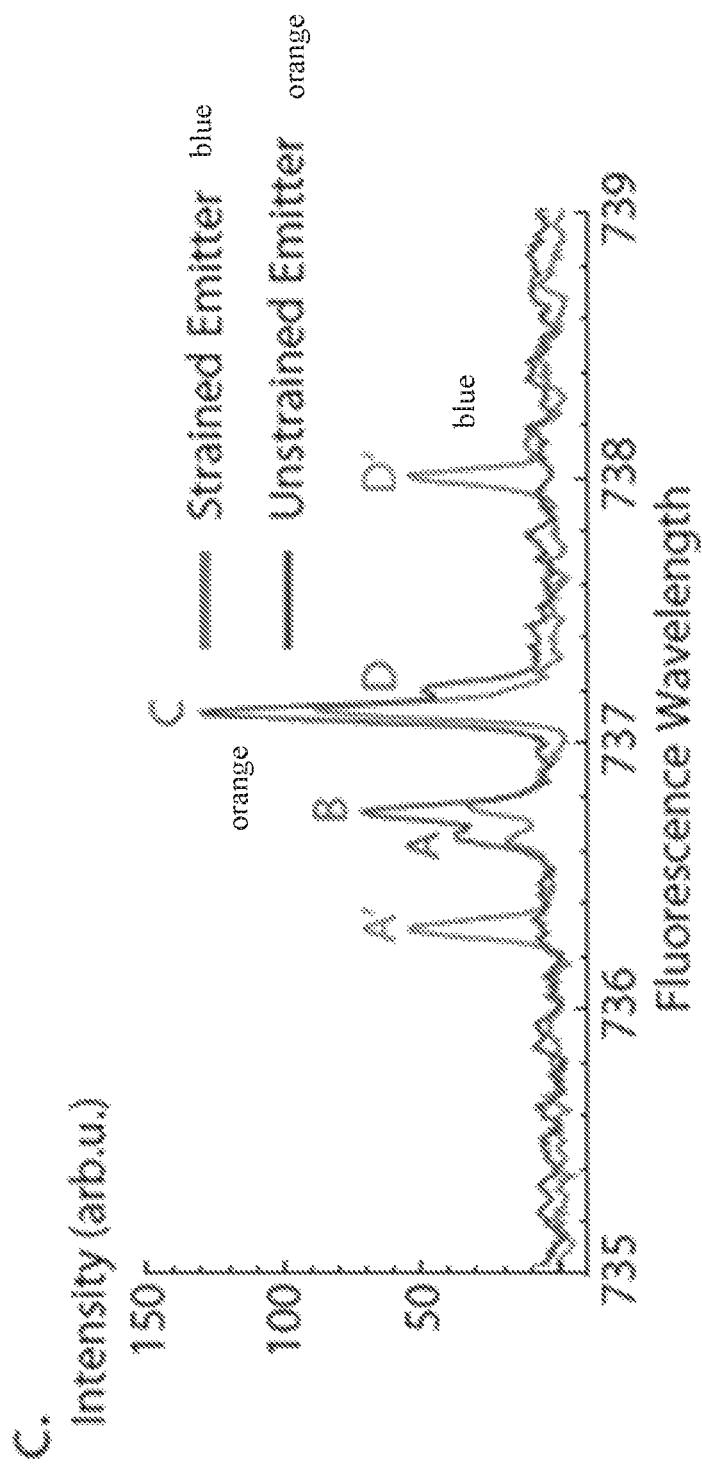
FIG. 1c shows a fluorescence spectra taken from single SiV$^-$ centers in high-strain (blue) and low-strain (orange) environments at 9-15 K. Transitions B and C are less sensitive to strain compared with transitions A and D because the ground and excited states shift in the same (opposite) directions for transitions B and C (A and D).

The SiV⁻ and GeV⁻ centers are sensitive to strain, which can further increase the splitting in the ground and excited state manifolds (FIG. 1b, last column). Transitions B and C are relatively insensitive to strain (FIG. 1c). Transition C is between the lowest energy ground and excited states which are also isolated from the phonon bath at low temperatures. This transition is therefore most suitable for applications in quantum optics.

Creating SiV– and GeV⁻ Centers with Ion Implantation

In one or more embodiments SiV⁻ centers can be prepared using the following procedure: First, one can begin with a polished CVD diamond (Element Six Inc., $[N]^0_S$<5 ppb, {100} oriented top face). Mechanical polishing can produce a strained and damaged layer close to the surface that results in reduced mechanical stability of nanofabricated structures. This damage is reduced by removing 5 μm of diamond through reactive ion etching, producing a smooth (under 1 nm RMS roughness) surface. An otherwise identical control sample can also be put through the same implantation procedure but without this pre-etching step. Then $^{29}Si^+$ ions (e.g., Innovion Corporation) are implanted at a dose of $10^{10}$ ions/cm² and an energy of 150 keV resulting in a depth of 100(20) nm. An equivalent procedure can be performed with $^{74}Ge^+$ ions at 270 keV resulting in a depth of 100(16) nm to create GeV centers. The procedures described herein can also be performed with a focused ion beam.

After implantation, two high-temperature high-vacuum (≲10⁻⁶ Torr) anneals can be performed with dwell times of eight hours at 800° C. (where vacancies are mobile) and, for the second anneal, two hours at 1100° C. (where divacancies and other defects can also anneal out). This annealing procedure both aids in the formation of SiV⁻ and GeV⁻ centers and also helps remove damage to the crystal lattice, reducing local strain. The residual graphitic carbon produced during these high-temperature anneals is then removed with an oxidative acid clean (e.g., boiling 1:1:1 conc. perchloric:nitric:sulfuric acid).

SiV⁻ Centers in Bulk Diamond

Figure 2A:
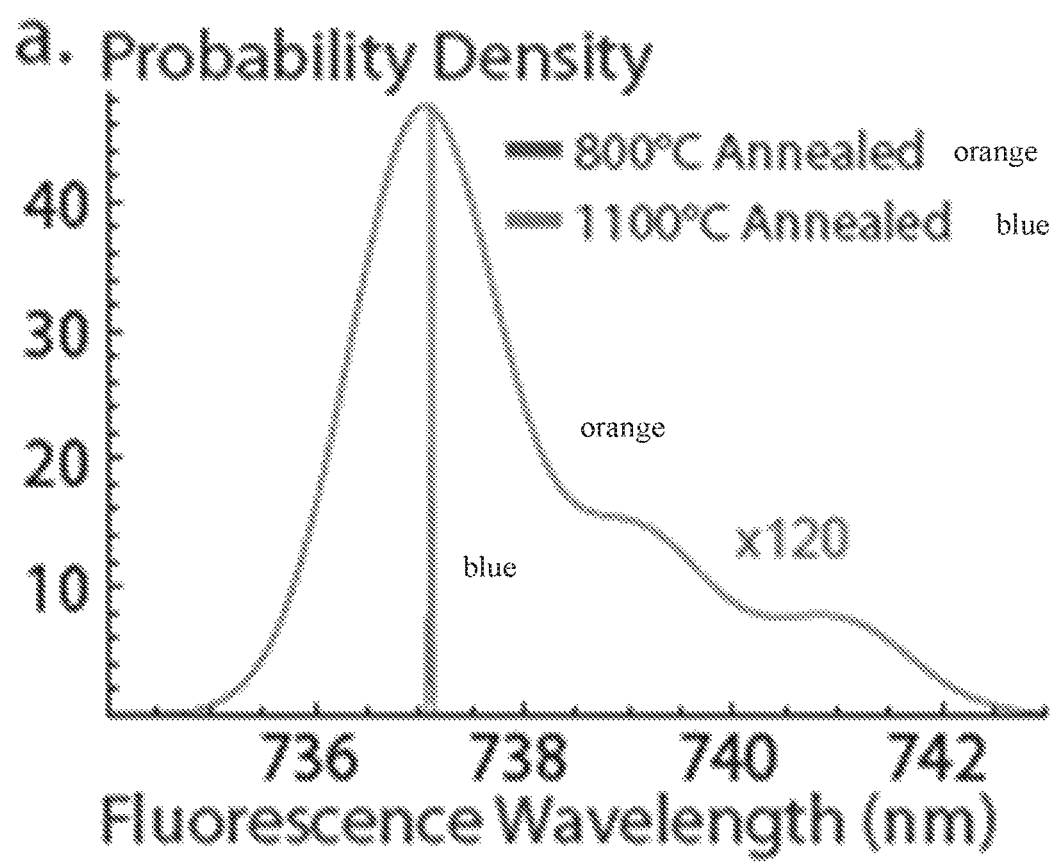
FIGS. 2a-2c show an inhomogeneous distribution of fluorescence wavelengths of implanted SiV$^-$ center transitions.
Figure 2B:
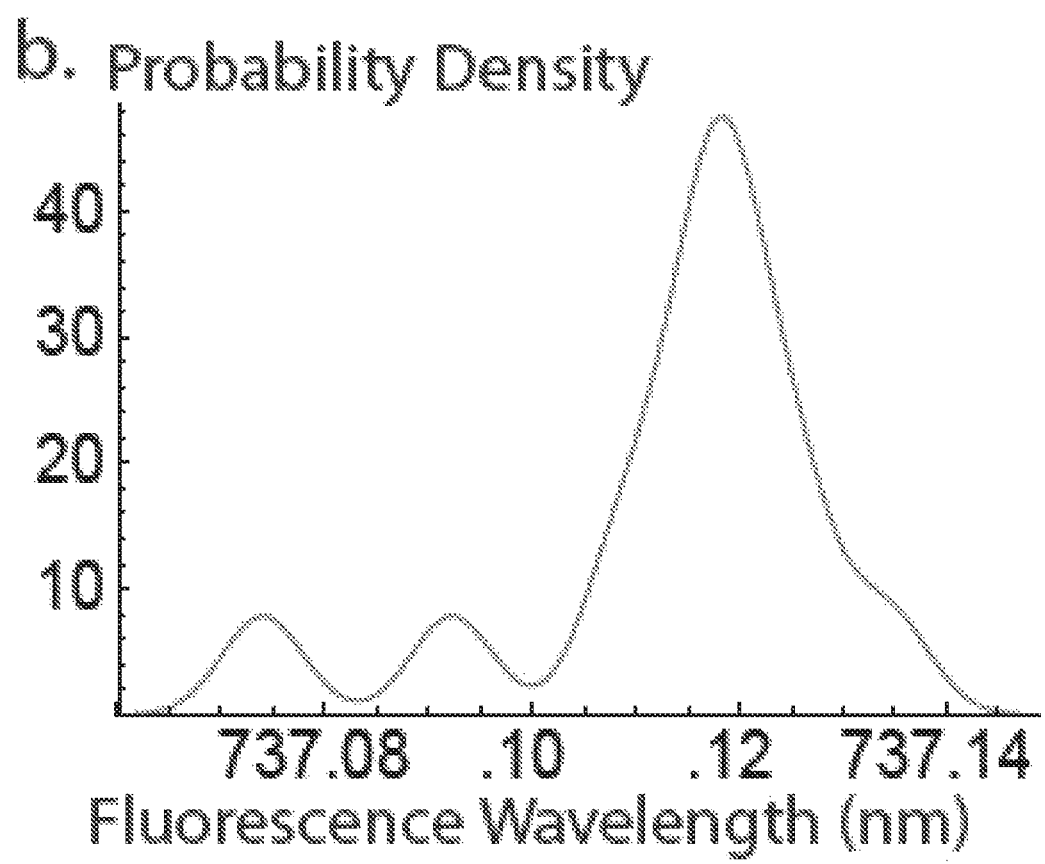

First, the inhomogeneous distribution of the implanted SiV⁻ fluorescence wavelengths after each annealing step are characterized by using a spectrometer (Horiba iHR550, 0.025 nm resolution). To avoid phonon-induced broadening of the optical transitions, these measurements are performed at 9-15 K. After annealing at 800° C., the observed distribution is broad, with about half of the emitter transition wavelengths lying within a 3-4 nm range (FIG. 2a). Transition C can be used where unambiguous identification is possible; otherwise, the brightest transition (which should correspond to transition C) can be used. After the 1100° C. anneal, the distribution becomes more than 100 times narrower, with about half of the 13 measured emitters (transition C) now lying in a 0.03 nm (15 GHz) window (FIGS. 2b and 2a, blue curve). In both cases, focus is on transition C because it is the brightest transition and relatively insensitive to strain and phononic decoherence. The other transitions are also more narrowly distributed after 1100° C. annealing. This result is a significant improvement on the roughly 8 nm inhomogeneous distribution previously reported for implanted SiV$^-$ centers and is comparable to reported inhomogeneous distributions reported for SiV$^-$ centers created during CVD growth.

Figure 2C:
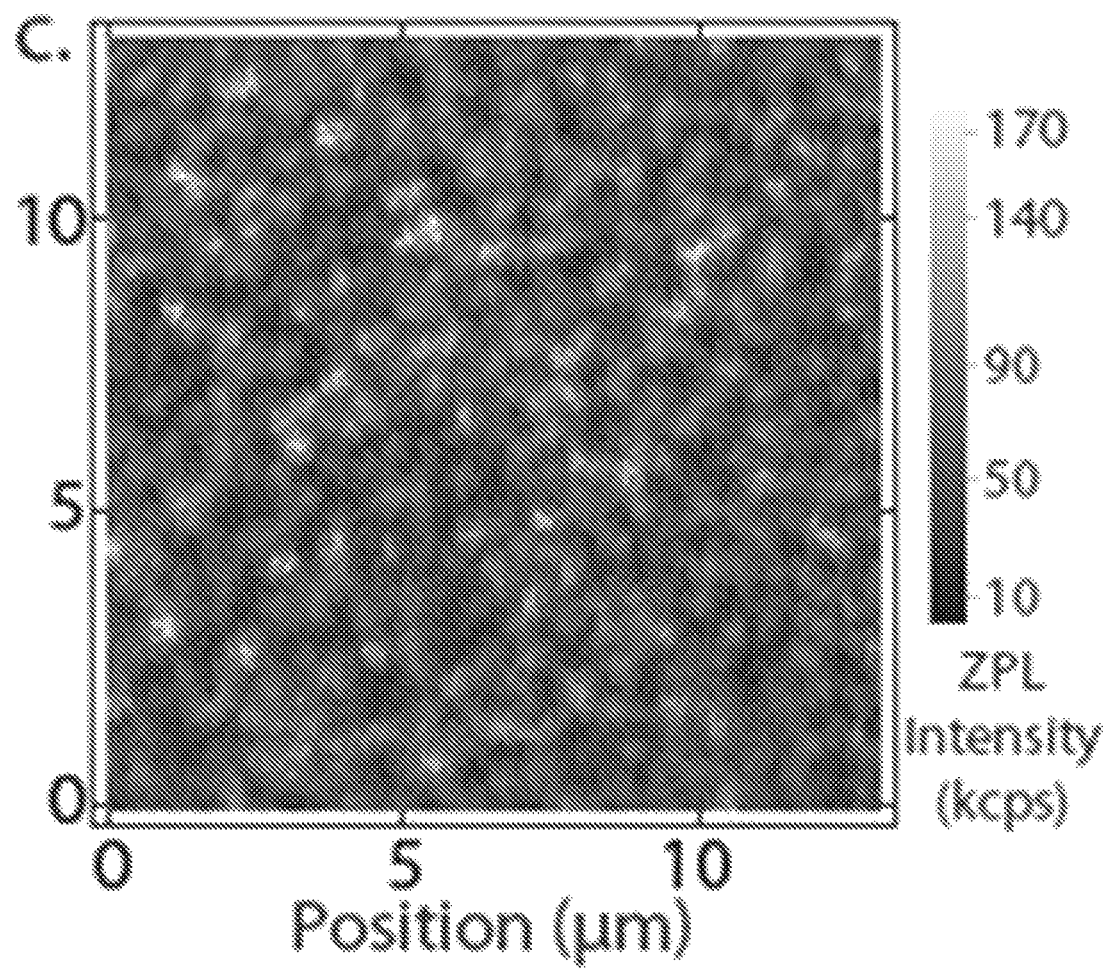

To estimate the yield of conversion from implanted Si$^+$ ions to SiV$^-$ centers, scanning confocal microscopy (FIG. 2c) is performed. Exciting with several milliwatts of off-resonant light (700 nm) gives around $10^5$ counts per second (cps) in a single spatial mode from a single SiV$^-$ in a 20 nm spectral range around the ZPL. A series of these images were analyzed to estimate SiV$^-$ creation yield to be 0.5-1%. There was no clear difference in the yield after performing the 1100° C. anneal. Furthermore, the yield in the sample that was not pre-etched was significantly higher (2-3%). The fact that higher-temperature annealing did not increase the yield and that the sample with greater surface damage had a larger yield supports the hypothesis that SiV$^-$ formation is limited by the presence and diffusion of nearby vacancies. This yield could potentially be increased by electron irradiating the sample to create a higher vacancy density in a controllable way. A similar procedure was used to estimate the creation yield of GeV$^-$ centers (from Ge$^+$ ions) and suggests that the yield is approximately the same.

Figure 2D:
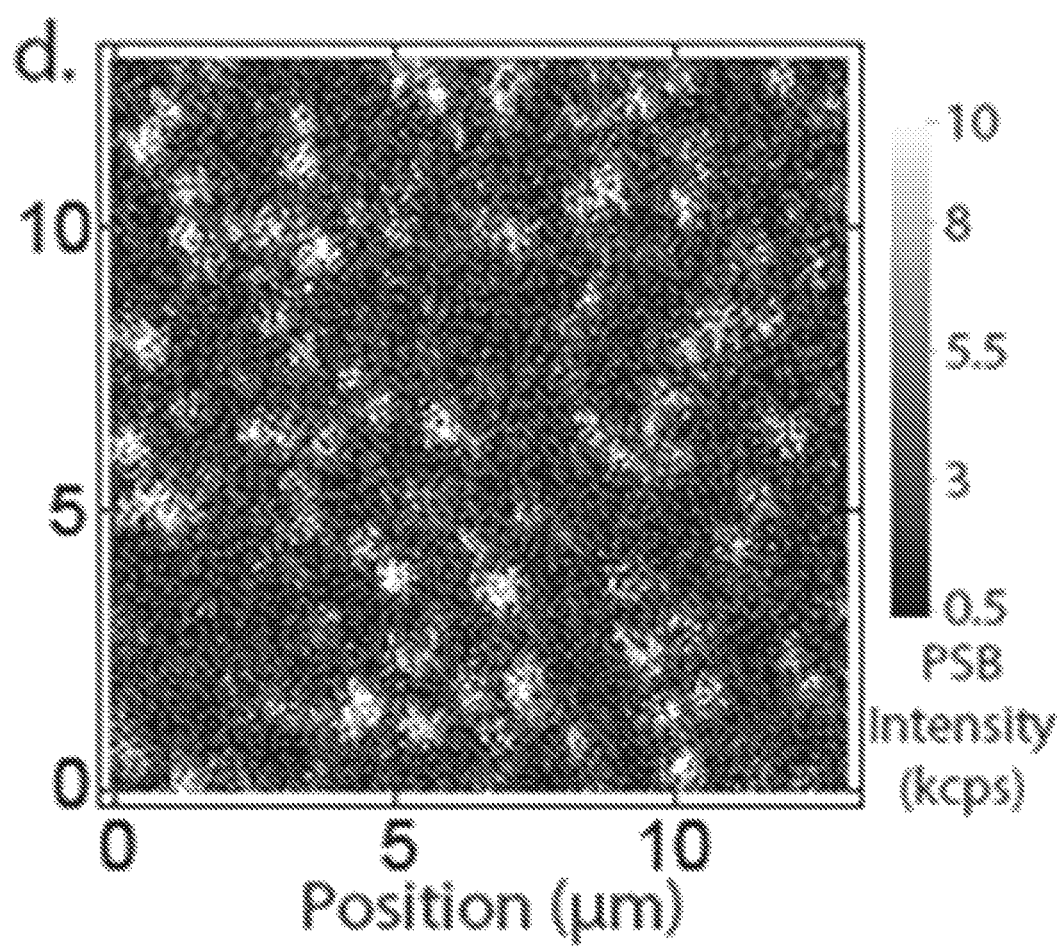

To visualize the density of nearly resonant SiV$^-$ centers, the inventors resonantly excited the SiV$^-$ centers with a Rabi frequency of several GHz using a home-built external-cavity diode laser tuned to the center of the inhomogeneous distribution. The inventors scanned spatially over the sample and collected fluorescence on the phonon sideband (PSB). The resulting image taken in the same region of the sample (FIG. 2d) has about a factor of three fewer emitters compared to the image taken with off-resonant excitation (~100 vs. ~340); roughly 30% of the emitters are near-resonant. In further exemplary embodiments, even higher temperature annealing could further reduce this inhomogeneous distribution, which could be limited by local strain induced by the presence of other defects.

SiV$^-$ Centers in Nanostructures

Figure 3A:
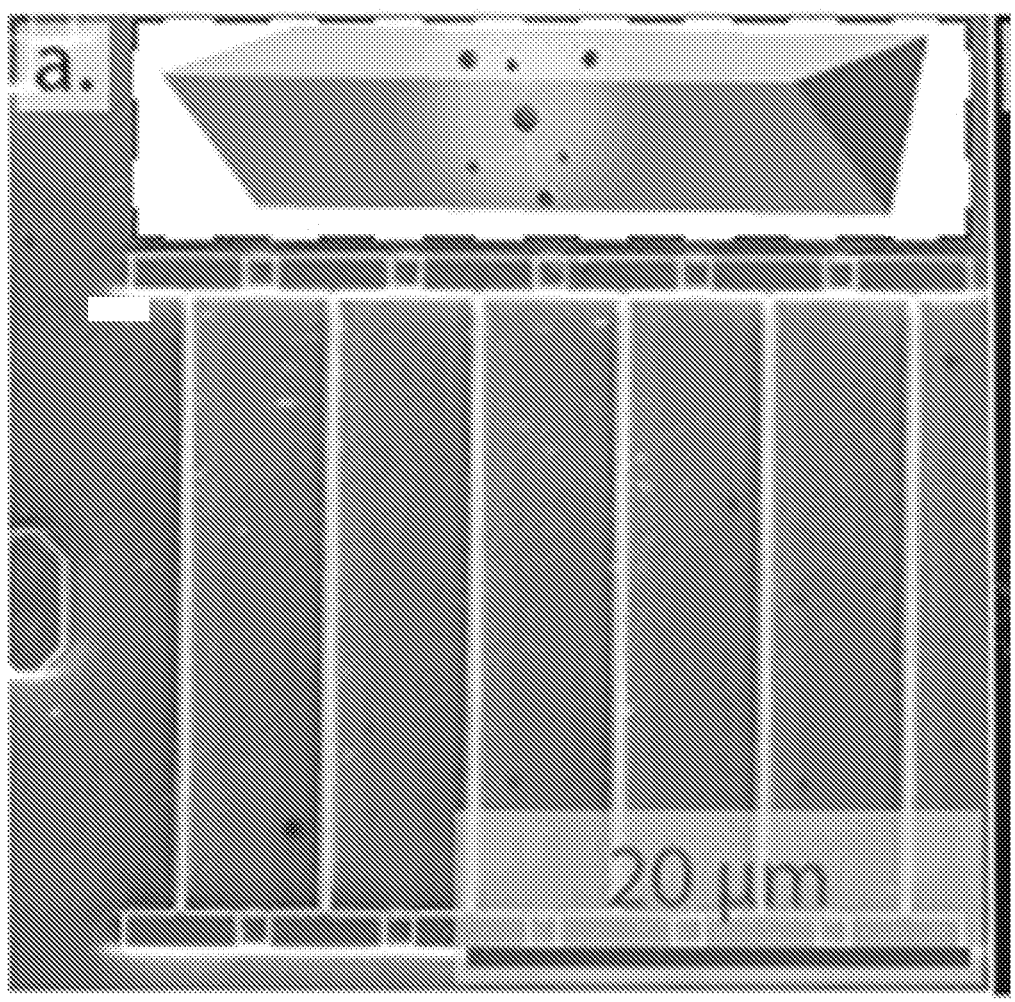
FIGS. 3a-3d show SiV$^-$ centers in nanostructures.

One major advantage of building quantum devices with solid-state emitters rather than trapped atoms or ions is that solid state systems are typically more easily integrated into nanofabricated electrical and optical structures. The scalability of these systems is important for practical realization of even simple quantum optical devices. Unfortunately, many solid-state systems suffer serious deterioration in their properties when incorporated into nanostructures. For example, the large permanent electric dipole of NV$^-$ centers in diamond causes coupling of the NV$^-$ to nearby electric field noise, shifting its optical transition frequency as a function of time. The SiV$^-$ and GeV$^-$ is immune to this spectral diffusion to first order because of its inversion symmetry and is therefore an ideal candidate for integration into diamond nanophotonic structures. With this in mind, an array of diamond nanophotonic waveguides (FIG. 3a) on the pre-etched sample characterized above was fabricated.

Figure 3B:
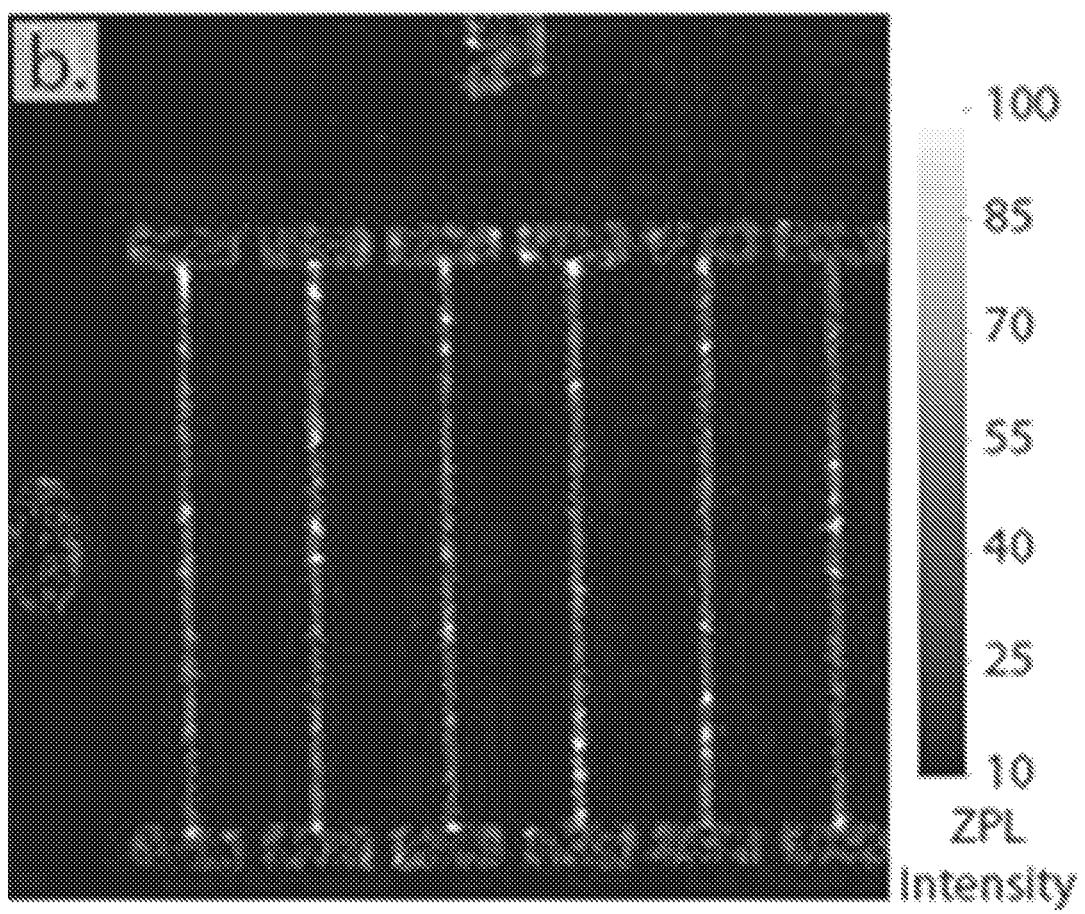

According to an exemplary embodiment, each waveguide (FIG. 3a, inset) is 23 μm long with approximately equilateral-triangle cross sections of side length 300-500 nm. After fabrication, the inventors again performed the same 1100° C. annealing and acid cleaning procedure. Many SiV$^-$ centers are visible in a fluorescence image of the final structures (FIG. 3b).

Figure 3C:
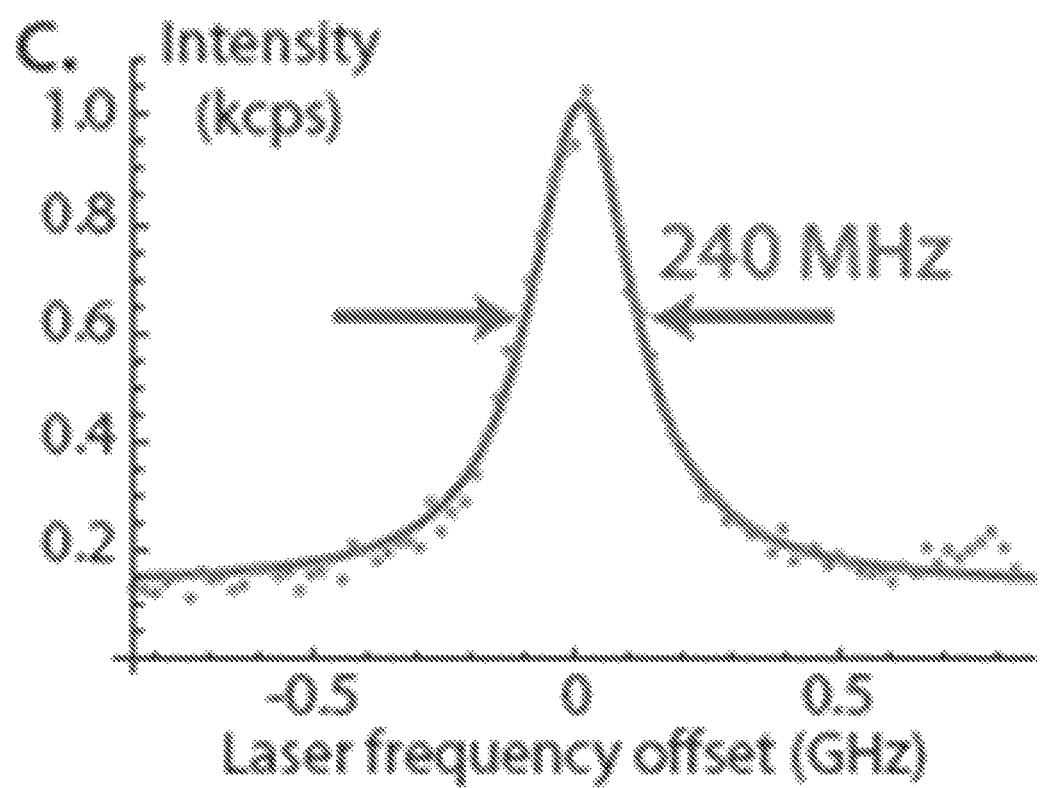
Figure 3D:
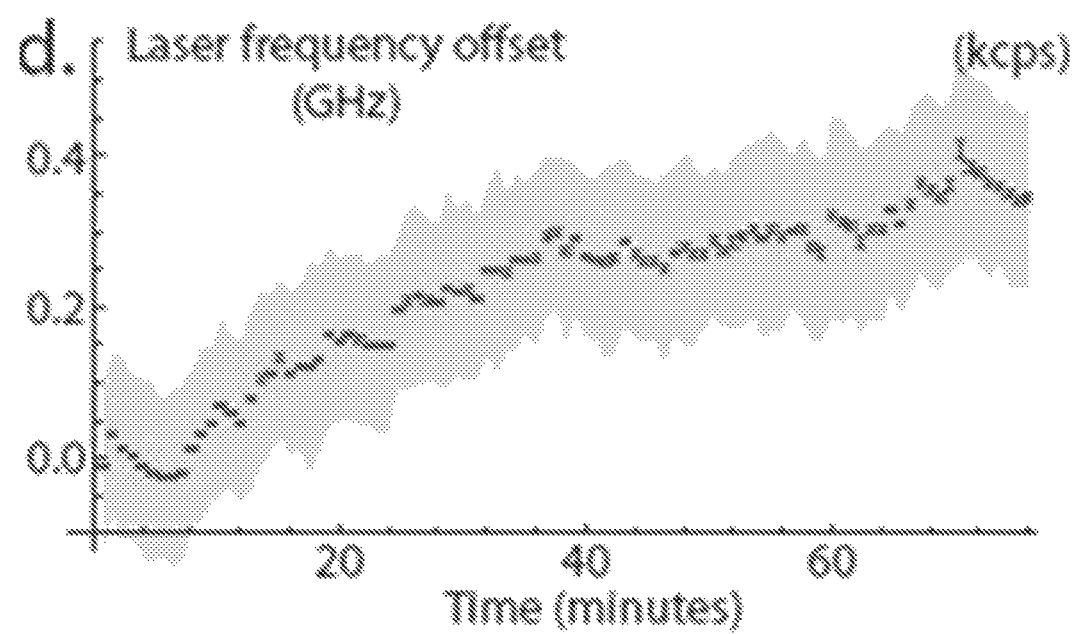
Figure 10:
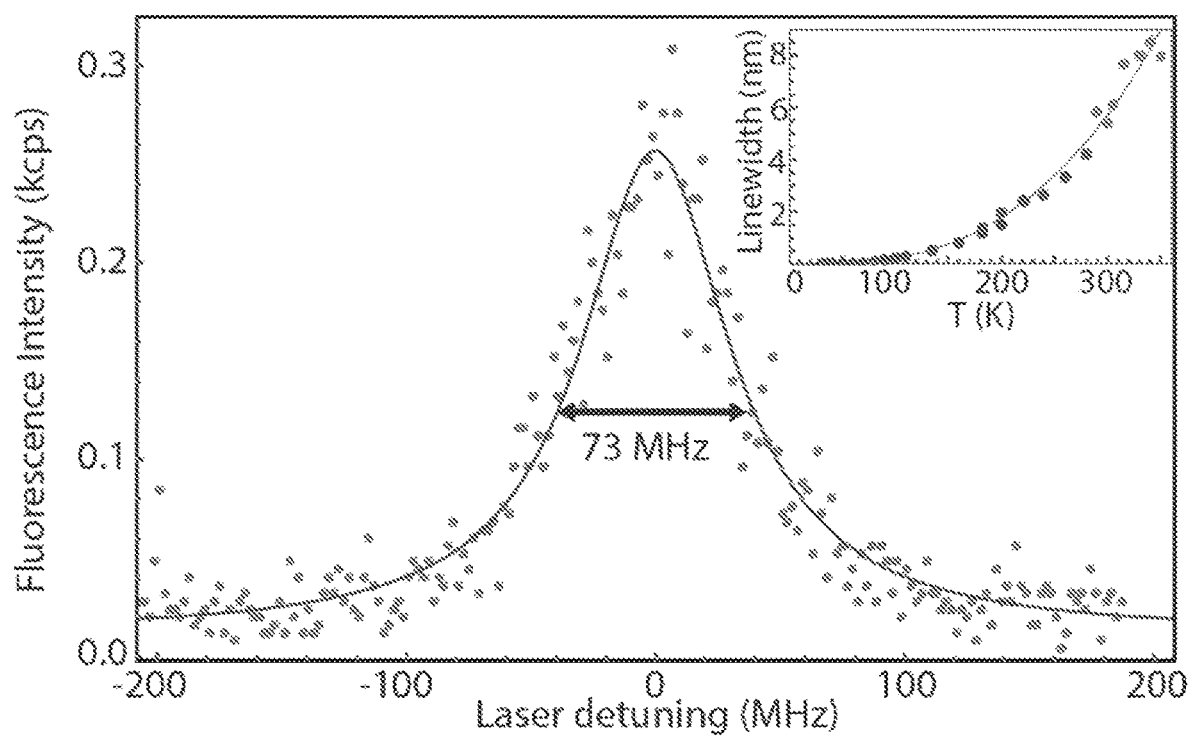
FIG. 10 shows a time-averaged photoluminescence excitation (PLE) measurement of the GeV transition C optical linewidth taken at T=5K below saturation. The solid curve is a Lorentzian fit. (Inset) Linewidth as a function of temperature, PL spectrum measured on a spectrometer under 520 nm excitation. Different colored points correspond to different emitters. The solid curve is a fit to a $T^3$ model.

Finally, the inventors performed photo-luminescence excitation (PLE) spectroscopy to confirm that the SiV$^-$ centers inside diamond nanobeam waveguides exhibited narrow-linewidth optical transitions. In this experiment, the inventors scanned the frequency of a resonant laser (New Focus Velocity (SiV), home-made sum-frequency generation laser from 1550 nm ThorLabs diode and 980 nm Ti:Saph laser from M-Squared (GeV), linewidth $\Delta f \lesssim 25$ MHz for both lasers over the course of each respective experiment) over the ZPL and monitored the fluorescence on the PSB. The inventors integrated over several scans to reconstruct the time-averaged shape and position of the SiV$^-$ and GeV$^-$ ZPLs (FIG. 3c). By extracting the center wavelength of each individual scan, the inventors determined the rate of fluctuation of the ZPL position and therefore quantified spectral diffusion (FIG. 3d). The GeV$^-$ center has an even smaller range of spectral diffusion with a time-averaged optical transition linewidth of 73 MHz, as illustrated in FIG. 10. All of the measurements described in this paragraph were performed at 4-5 K.

SiV$^-$ centers in nanostructures have narrow transitions with a full-width at half-maximum (FWHM) of $\Gamma_n/2\pi = 510 \pm 360$ MHz (ensemble average for N=11 emitters), only a factor of 5.4 greater than the lifetime limited linewidth $\gamma/2\pi = 94$ MHz. Emitters in bulk had slightly narrower transitions with linewidths of $T_b/2\pi = 350 \pm 180$ MHz (N=13). As defined here, these linewidths include the effects of phonon broadening and all spectral diffusion that happens at any timescale during the course of the experiment (4-15 minutes). The ratios of $\Gamma_n/\gamma$ and $\Gamma_b/\gamma$ are much lower than the values for NV$^-$ centers, where the current state of the art for typical implanted NV$^-$ centers in nanostructures and in bulk is $\Gamma_n/\gamma \gtrsim 100-200$ and $\Gamma_b/\gamma \gtrsim 10$ ($\gamma/2\pi = 13$ MHz). Germanium-vacancy centers have similar values for $\Gamma_n/\gamma$ and $\Gamma_b/\gamma$ as described above. Optical transition frequencies in SiV$^-$ and GeV$^-$ centers are stable throughout the course of the experiment, with spectral diffusion on the order of the total optical linewidth even after more than an hour (FIG. 3d). This is not true with NV centers, for example, where the total spectral diffusion can be significantly broader than the linewidth measured over short times. Characterizing the inhomogeneous distribution of SiV$^-$ centers in nanostructures is challenging because off-resonant excitation leads to strong background fluorescence, making exhaustive identification of all SiV$^-$ centers in a given region difficult. Nevertheless, multiple SiV$^-$ centers in nanostructures can be found at nearly the same resonance frequency: to find the above eleven emitters, the inventors scanned the laser frequency over only a 20 GHz range. Subsequent experiments with implanted SiV$^-$ centers suggest that these properties are also independent of implantation dose (at least up to ~$10^{12}$ cm$^{-2}$), allowing high densities of nearly-resonant SiV$^-$ centers to be created.

The residual broadening of the optical transition can result from a combination of second-order Stark shifts and phonon broadening. The presence of a strong static electric field would result in an induced dipole that linearly couples to charge fluctuations, accounting for the slow diffusion. It is also possible that the large local strain observed in the system could shift the equilibrium geometry of the SiV$^-$ or GeV⁻ atoms, reducing the symmetry of the system and producing a static dipole that could couple to electric fields. Finally, in the case of the SiV⁻ center, up to 50 MHz of additional broadening could arise from the hyperfine interaction present due to the choice of $^{29}$Si ions.

The invention is described with reference to the following examples, which are presented for the purpose of illustration only and not intended to be limiting.

Setup Description

Figure 4:
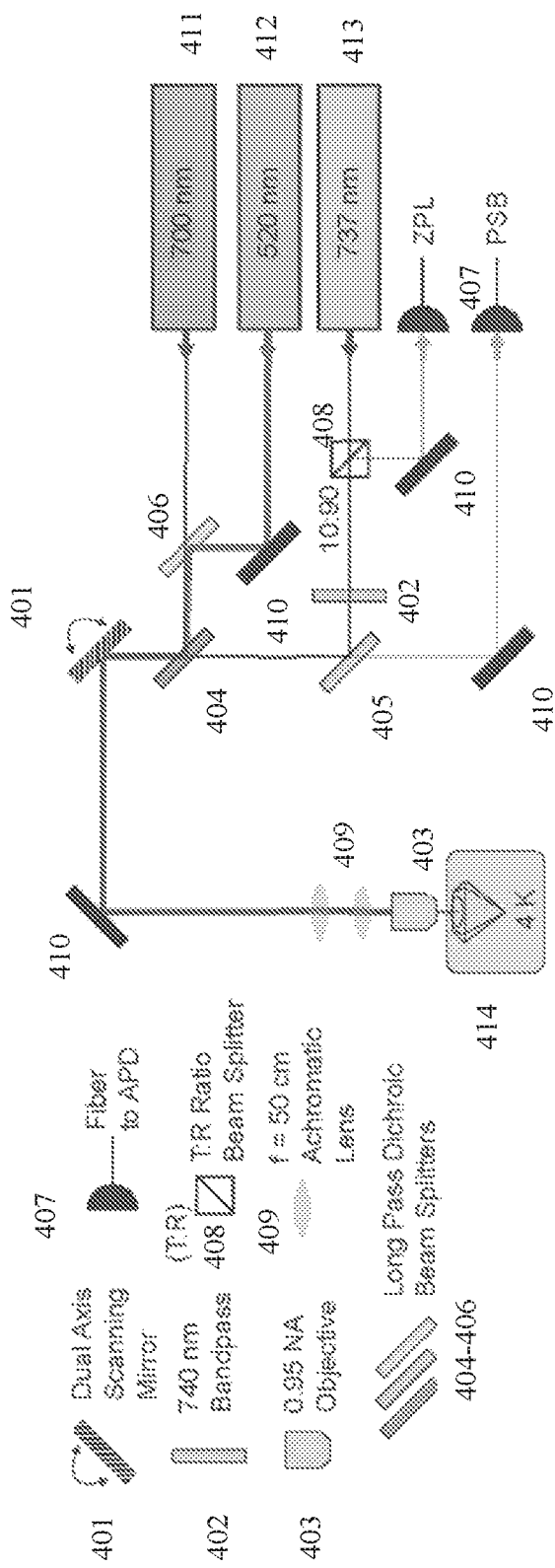
FIG. 4 shows a general confocal microscope design. The 500 nm and 700 nm lasers are used to excite the SIV$^-$ off-resonantly. The 737 nm ECDL is used to excite the SIV$^-$ resonantly. Collection can be performed either on the ZPL (if the excitation is off-resonance) or the PSB (in either excitation scheme). For the cyrogenic measurements, the objective and the sample are in the vacuum chamber and the sample is clamped to the cold finger of a flow-through cryostat.

The experiments were carried out in three different scanning confocal microscopes fabricated in-house. To perform the cryogenic measurements, the inventors used two 4K helium flow cryostats: a Janis Cryogenics model ST-500 and later a modified probe-station (Desert Cryogenics model TTP4). The room-temperature measurements of the bulk SiV⁻ and GeV⁻ centers used to extract the yield of the implantation process were measured in a separate room-temperature microscope. All three microscopes used a 0.95 NA microscope objective (Nikon CFI LU Plan Apo Epi 100x). In the cryogenic measurements, the objective was inside the vacuum chamber. A general schematic of the experimental apparatus is shown in FIG. 4 according to an exemplary embodiment. FIG. 4 shows a 700 nm laser 411, 520 nm laser 412, and 737 nm laser 413. Laser 411 supplies a laser beam that pass through long pass dichroic beam splitter 406, reflects off of long pass dichroic beam splitter 404, dual axis scanning mirror 401, a mirror 410, and then passes through two f=50 cm achromatic lens 409 and a 0.95 NA objective and then reaches the target 414. The beam from laser 412 reflects off of a mirror 410, long pass dichroic beam splitter 406, long pass dichroic beam splitter 404, dual axis scanning mirror 401, a mirror 410, and then passes through two f=50 cm achromatic lens 409 and a 0.95 NA objective and then reaches the target 414. The beam from laser 413 passes through a T:R ratio beam splitter 408, 740 nm bandpass 402, reflects off of long pass dichroic beam splitter 405, passes through long pass dichroic beam splitter 404, and then reflects off of dual axis scanning mirror 401 and a mirror 410, and then passes through two f=50 cm achromatic lens 409 and a 0.95 NA objective and then reaches the target 414. The beam from laser 413 is also split by the T:R ratio beam splitter 408 and reflects off a mirror 410 to a fiber to APD 407 to reach a zero-phonon line (ZPL). The beam from laser 413 is also split at long pass dichroic beam splitter 405, reflects off of a mirror 410 to a fiber to APD 407 to reach a the phonon-sideband (PSB).

Because the SiV⁻ and GeV⁻ linewidths are a strong function of the temperature, it is important to make sure the sample is as cold as possible. For exemplary linewidth measurements, the inventors therefore placed a thin indium foil spacer between the sample and the sample stage and clamped the sample to the stage (3.5 K). Based on other measurements using this technique, the inventors expect the temperature of the sample can be under about 6K. Other sample mounting techniques (silver paint, thermal grease, varnish) have been less effective at reaching these low temperatures, primarily from the radiation load from the room-temperature objective.

To measure the fluorescence wavelengths of the SiV⁻ centers (e.g. to produce the data in FIG. 1c and FIG. 2a-2b) the SiV⁻ centers are excited using off-resonant light (e.g., approximately 5 mW) from a 700 nm diode laser (e.g., Thorlabs LP705-SF15). Off-resonant excitation with a 520 nm diode laser (e.g., Thorlabs LP520-SF15) is also possible, and using both of these wavelengths together results in a superlinear enhancement in the observed count rate, suggesting that the 520 nm laser may play a role in stabilizing the SiV⁻ charge state. The same 520 nm diode laser can also be used to off-resonantly excite the GeV⁻ center. The resulting fluorescence is sent to a spectrometer (e.g., Horiba iHR550 imaging spectrometer with Synapse CCD and 1800 gr/mm) with a spectral resolution of 0.025 nm. When describing the distribution of emitter wavelengths in FIG. 2, transition C was chosen for the samples annealed at 1100° C. Although other transitions had slightly broader distributions, each transition had a much narrower distribution than after the 800° C. anneal. For the spectra taken after 800° C. annealing only, transition C was chosen whenever unambiguous assignment was possible. Occasionally, spectra had only one or two clear lines or contained broad features; in these cases, the brightest line (which should correspond to transition C) was chosen. Identifying the transitions after 1100° C. annealing was straightforward, with the occasional exception of transition D.

To measure the linewidths of the SiV⁻ centers, the SiV⁻ center was excited with an external-cavity diode laser (in FIG. 2d, based on Opnext Diode HL7302MG operated in the Littrow configuration; in FIG. 3, Newport/New Focus Velocity TLB-6711-P) resonant with the SiV⁻ zero-phonon line (ZPL) around 406.62 THz and monitor the phonon-sideband (PSB) fluorescence of the SiV⁻. As one sweeps over the SiV⁻ resonance, a peak in PSB counts is detected. For all frequency scans, the instantaneous laser frequency was monitored and stabilized using a high resolution wavemeter (High Finesse WS7) with 10 MHz resolution and 50 MHz accuracy. This resulted in an approximately 25-50 MHz total laser linewidth over the course of the experiment. Single photons were detected using single photon counting modules (2 Picoquant τ-SPADs and/or Excelitas SPCM-NIR, each with around 350 ps FWHM measured timing jitter). The used a laser noise eater (e.g., Thorlabs LCC3112H) to stabilize laser power to less than 1% during frequency scans.

To resonantly excite the GeV⁻ centers, sum-frequency generation using a nonlinear crystal (ADVR KTP) can be employed, mixing 980 nm laser light from a Ti:Sapphire laser (M-Squared SolsTiS-2000-PSX-XF) and 1550 nm laser light from an external cavity diode laser (Thorlabs SFL 1550P) in a fiber-based wavelength division multiplexer (Thorlabs WD202A-APC). The output fiber is cleaved and coupled to a waveguide in the nonlinear crystal, which has around 1 nm bandwidth. The frequency of the Ti:Sapphire laser can be tuned to modulate the frequency of the around 600 nm light. The wavelength is recorded on a high resolution wavemeter (High Finesse WS7) with 10 MHz resolution and 50 MHz accuracy.

Fabrication and Implantation Procedures

Bulk SiV⁻ and GeV⁻ Creation

The process can begin with an electronic-grade CVD diamond (e.g., from Element Six Inc.). The top surface has a {100} crystallo-graphic orientation. The concentrations of impurities are [N]S⁰<5 ppb and [B]<1 ppb. The sample is polished on a scaife, e.g., by Element Six. After obtaining the sample, an oxidative acid clean can be performed in, e.g., 1:1:1 conc. Nitric:conc. Sulfuric:70% perchloric acid. The sample is placed in the acid mixture and boiled for at least 45 minutes, then allowed to cool and rinsed with ultrapure water (Millipore Direct-Q 3 or equivalent) and blow-dried out of isopropanol. This procedure was performed after each annealing step to remove graphitic carbon present on the diamond surface after annealing and also produces an oxygen surface termination.

The sample is then etched in a Unaxis Shuttleline inductively-coupled plasma reactive ion etcher (ICP RIE). This pre-fabrication etch ("pre-etch") reduces the surface roughness of the diamond sample and relieves strain created from the mechanical polishing process. The sample is first etched for 30 minutes with an Ar/Cl$_2$ plasma mixture to remove around two microns of diamond. This etch is followed by a 30-minute O$_2$ etch that removes around five microns of diamond. At the end of this process, the diamond surface has less than 1 nm RMS roughness over several square microns.

Figure 5:
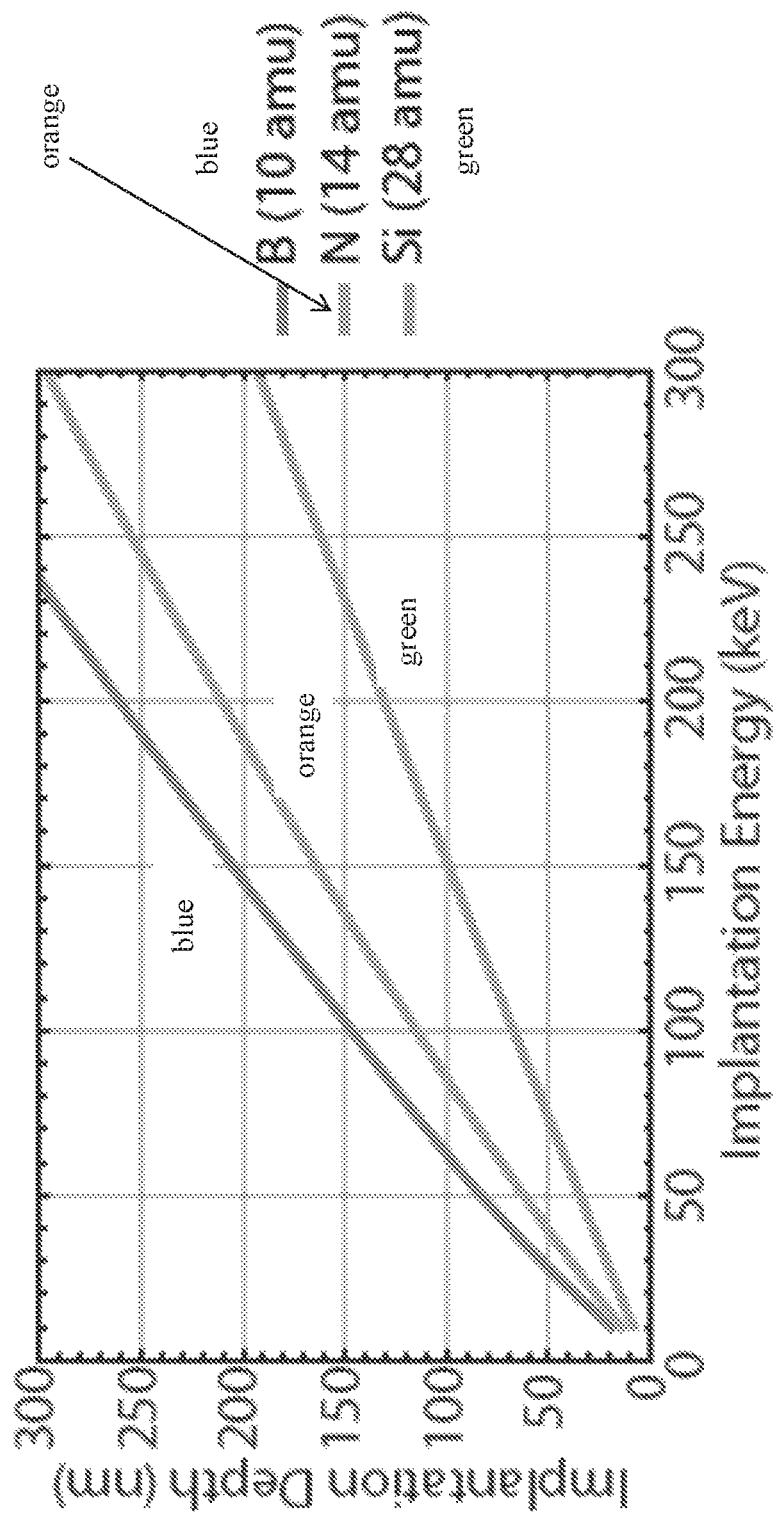
FIG. 5 shows a predicted depth as a function of implantation energy for a few common diamond dopants as calculated with the Stopping Range of Ions in Matter (SRIM) package. An implantation energy of 150 keV was used, which should correspond to a depth of around 100 nm. This depth corresponds to an implantation energy of around 85 keV for nitrogen ions.

Next, $^{29}$Si$^+$ ions are implanted at 150 keV at a dose of 1×10$^{10}$ ions/cm$^2$. Based on calculations using the Stopping Range of Ions in Matter (SRIM) package, this energy should result in a Si depth of around 100 nm (FIG. 5). Alternatively, $^{74}$Ge$^+$ ions at 270 keV can be implanted to achieve GeV centers at the same depth (100 nm). Note that any isotope of either Si or Ge, for example, can be used for this implantation technique, and that the depth of the resulting ions can be tuned arbitrarily, limited only by the energy limits of the implantation instrument.

After implantation, a high-temperature high-vacuum annealing procedure is performed. First, the chamber is heated over four hours to 400° C. to desorb water vapor from the chamber walls and lower the pressure inside the chamber. The temperature is held at 400° C. for eight hours, then ramped over twelve hours to 800° C. The primary purpose of this step is to create SiV$^-$ centers through vacancy diffusion. The sample was then acid cleaned and characterized to determine the SiV$^-$ yield and inhomogeneous distribution at this stage.

Next, the samples were annealed a second time. The steps up to 800° C. were identical to the previous anneal. After these steps, the temperature of the furnace was ramped over twelve hours to 1100° C. This slow ramp is used to keep the pressure in the furnace low. This temperature was maintained for two hours. This step is designed to anneal out divacancies and other defects. The mechanisms behind these annealing steps is consistent with the observations that the yield does not increase after the 1100° C. anneal, but the inhomogeneous distribution becomes significantly lower. Before each annealing stage, the surface of the sample can be characterized using X-ray photoelectron spectroscopy (e.g., Thermo Scientific K-Alpha XPS system) to verify that the surface is clean and free of contaminants (primarily Na, Cl, and Si). These steps can be performed without performing a low-temperature anneal in an oxygen environment. The sample is again characterized to determine the SiV$^-$ or GeV$^-$ yield and inhomogeneous distribution. The procedure as outlined so far in the case of the SiV$^-$ centers, with the exception of the pre-etch, was also repeated for a second sample.

Nanofabrication

After preparing and characterizing the bulk SiV$^-$ and GeV$^-$ centers as described above, triangular diamond nanobeam waveguides can be fabricated in order to characterize the quality of the resulting SiV$^-$ centers inside nanoscale photonic structures.

First, a pattern using e-beam lithography (e.g., Elionix ELS-F125, Microchem poly(methyl methacrylate) (PMMA) EL9/C2 resists) is defined. After development (1:3 methyl isobutyl ketone:isopropanol), approximately 200 nm of alumina is deposited using reactive sputtering of an aluminum target (e.g., AJA 3-target system) and then dissolve the PMMA to perform lift-off to define a mask. The chip is etched first top-down, e.g., in a PlasmaTherm Versaline ICP RIE system in an oxygen plasma (e.g., 170 V DC bias, 100 W RF bias, 700 siW ICP power with 30 sccm O$_2$ flow rate at 10 mTorr chamber pressure) to define nanoscale posts. The chip is then placed in a macroscopic Faraday cage in the shape of a triangular prism and etched again with the same parameters to create free-standing triangular diamond nanobeams. The sample is then acid cleaned, annealed using the 1100° C. recipe described above, and acid cleaned a final time.

Lifetime Measurements and Quantum Yield

Figure 11:
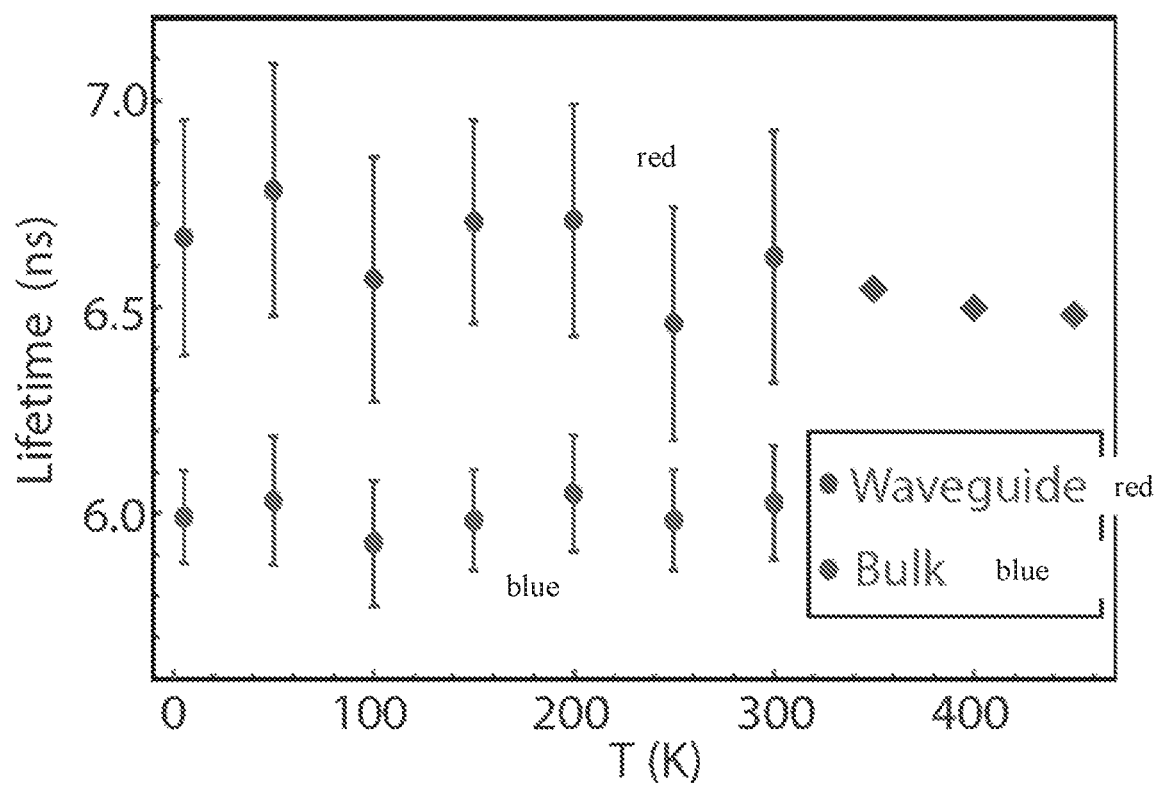
FIG. 11 shows the measurement of the optical excited state lifetime as a function of temperature in two different media: bulk diamond (blue), and a nanoscale diamond waveguide (red) with transverse dimensions on the order of the optical wavelength. Error bars represent standard deviation of measured lifetimes of seven different emitters. For T>300K, the lifetime was measured for a single GeV in a waveguide (red diamonds).

The consistent production of narrow linewidth SiV$^-$ and GeV$^-$ centers is a key result. In this context, "narrow" is relative to the lower bound on the linewidth determined by the lifetime. If the SiV$^-$ has a radiatively limited lifetime, it is possible for the lifetime in nanostructures to be significantly longer since the effective refractive index is lower inside such a structure. To probe this effect, the inventors measured the lifetime of nine SiV$^-$ centers. The lifetime measured in the waveguides ($\tau$=1.69±0.14 ns, N=5) was not significantly different from the lifetime measured in the bulk-like anchors ($\tau$=1.75±0.08 ns, N=4). This implies that the lifetime of the SiV$^-$ excited state is predominantly determined by a nonradiative decay rate. More thorough measurements of the SiV$^-$ lifetime in different environments would be useful in determining the quantum yield exactly. In contrast, the GeV$^-$ center shows no temperature dependence and a marked contrast between lifetimes in different media, as illustrated in FIG. 11. Both of these observations support the claim that the GeV$^-$ center has a high radiative quantum yield.

Autocorrelation Fluorescence Measurements

To verify that the emission detected in an exemplary experiment was coming from individual SiV$^-$ centers, the inventors performed fluorescence autocorrelation measurements on two SiV$^-$ centers inside diamond nanobeams. The inventors performed this measurement by exciting the SiV$^-$ centers off resonantly as described above and splitting the emission between two detectors in a Hanbury-Brown-Twiss configuration. The relative arrival times of the photons on the two detectors were recorded using fast acquisition electronics (PicoQuant HydraHarp 400) with a resolution better than 128 ps. The data were binned into 256 ps intervals.

Figure 9:
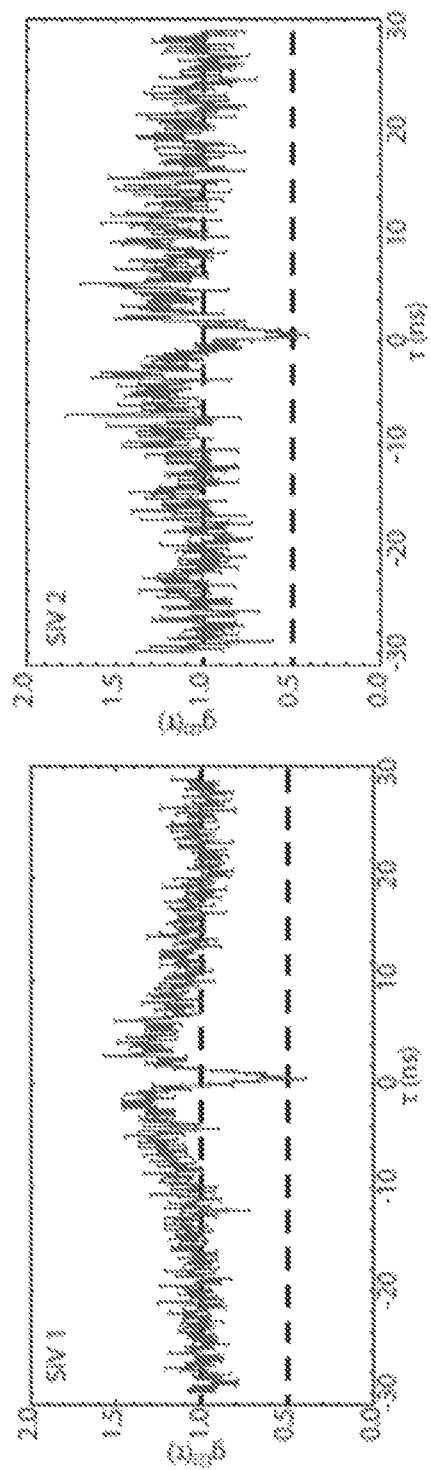
FIG. 9 shows autocorrelation measurement of two SiV$^-$ centers inside a diamond nanobeam as described in the text. Error bars are estimated assuming the noise of the number of detected photons follows a Poisson distribution (shot noise).

The relative photon detection times $g^{(2)}(\tau)$ (normalized by defining $g^{(2)}(\infty)$=1) are displayed in FIG. 9. For a single quantum emitter, the signal at zero time delay should have $g^{(2)}(0)$=0. A value of $g^{(2)}(0)$<0.5 would confirm that measuring emitters producing single photons. The data show a dip of $g^{(2)}(0)$~0.5. However, finite jitter on the detectors (section I) of around 350 ps causes the measured arrival times of the photons to be convolved with the detector response, hence limiting the sharpness and minimum value of the dip. This explains why the autocorrelation measurements do not show the full dip expected for a single quantum emitter.

Saturation: Linewidth as a Function of Power

Figure 6:
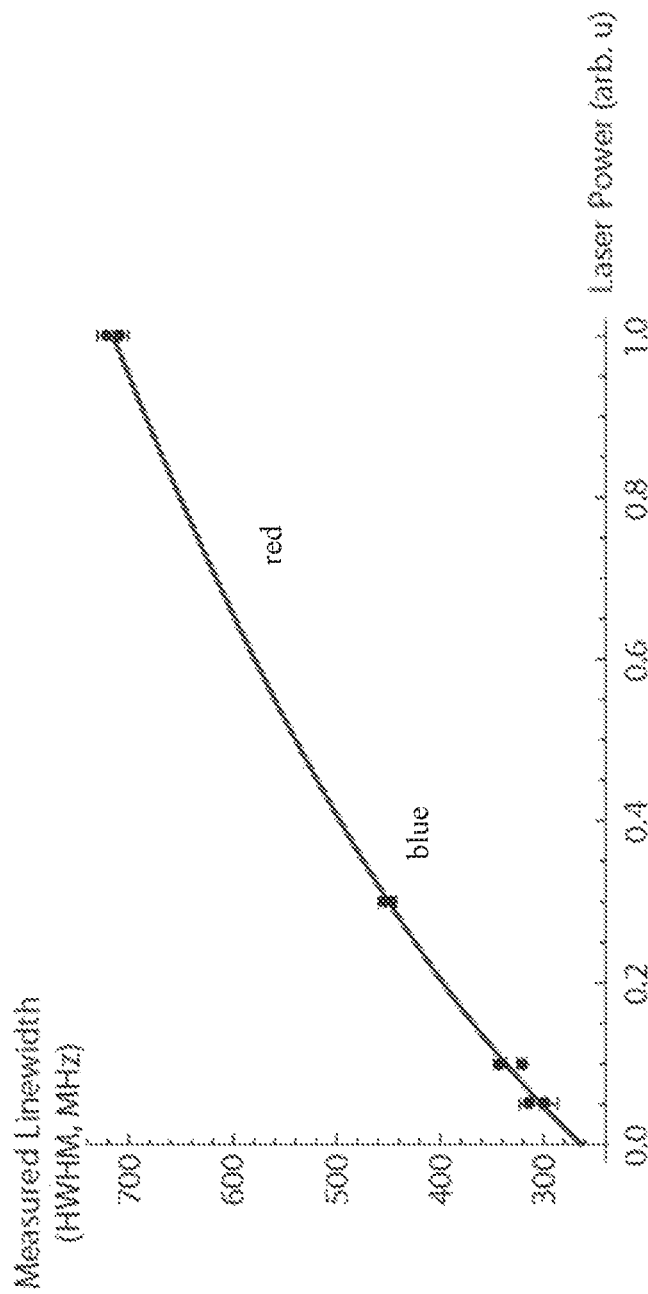
FIG. 6 shows a measurement of a SIV$^-$ linewidth as a function of applied laser power (blue points). The data is fit to the functional dependence expected for a two-level system (red line) as described in the text.

To assure that the linewidths were not limited by power broadening (and to probe the dynamics of the SiV$^-$ center), the inventors measured the linewidth of a SiV$^-$ center as a function of applied laser power I (FIG. 6). To check qualitative agreement of this data with theory, the inventors fit these linewidth based on the expected response of a two-level system: $\Delta v(I) = A\sqrt{1+BI}$ $\Delta v(I) = A\sqrt{1+BI}$ with fit parameters A and B. The agreement is quite good and the value at zero power is consistent with the (low-power) linewidths discussed above. The error bars on the data are the standard error in the fit parameters estimated from the variance in the data.

Inhomogeneous Distribution of all Transition Frequencies after Annealing

Figure 7:
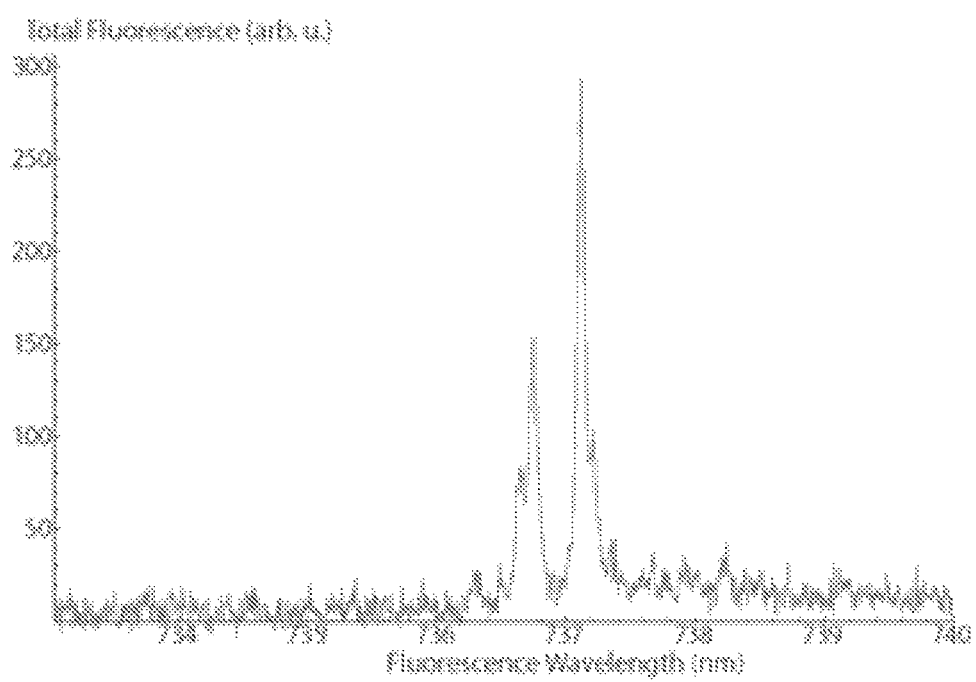
FIG. 7 shows a composite spectrum produced by adding together all the spectra for different SiV$^-$ centers after annealing at 1100° C. The SiV$^-$ fine structure is clearly present, demonstrating that the inhomogeneous distribution of transition wavelengths is small. The broad shoulder to the red of the main peaks arises from summing over several transition D peaks that appear in this wavelength range.

The text above (e.g. FIGS. 2a-2d) discussed the optical transition frequencies of transition C and noted the reduction in inhomogeneous distribution after 1100° C. annealing relative to 800° C. annealing. This reduction in inhomogeneous distribution is also present for the other optical transitions of the SiV⁻ center. FIG. 7 shows a plot of a composite spectrum constructed by summing over all of the 13 spectra taken from different SiV⁻ centers after 1100° C. annealing. To account for intensity variations from spectrum-to-spectrum, each spectrum is normalized and contributes equally to the sum. This composite spectrum is very similar to the spectrum of a single unstrained SiV⁻ center (FIG. 1c) and shows the expected fine-structure splitting. This demonstrates that the inhomogeneous distribution of SiV⁻ transition wavelengths is generally small compared to the fine-structure splitting. For example, the effective "linewidth" of transition C in this composite spectrum is about the same as the inhomogeneous distribution discussed above. (The disagreement in these quantities is due to the finite resolution of the spectrometer.) The increased intensity to the red of the main peaks at 737 nm arises from summing over several transition D peaks from highly strained emitters that appear in this wavelength range. The corresponding transition A peaks expected to the blue of the main peaks are probably suppressed by a combination of unfavorable branching ratios and phonon-induced decay of the upper excited state during the excited state lifetime.

Statistical Methods

Figure 8:
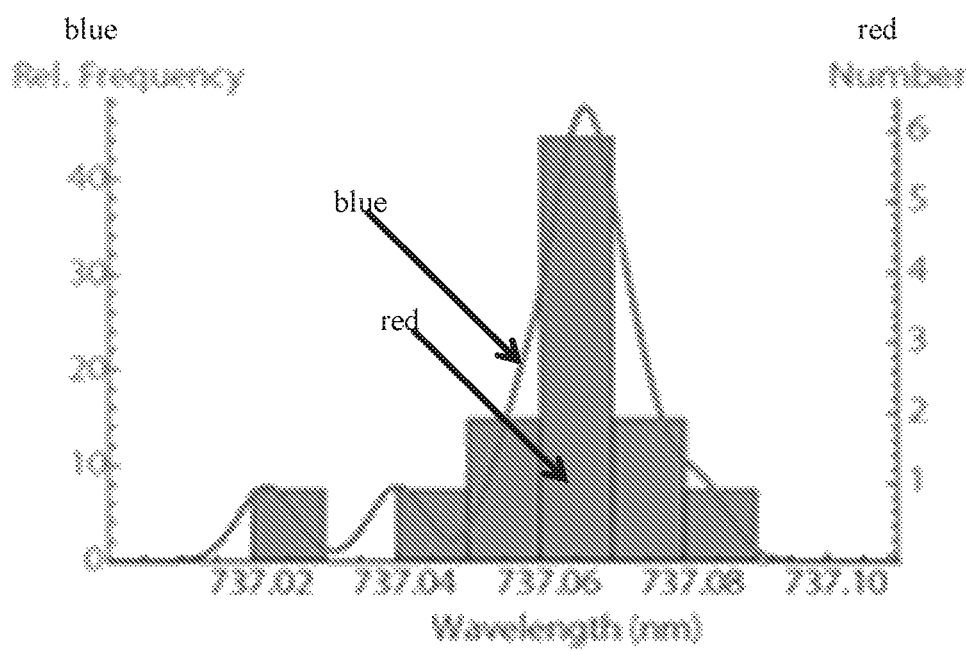
FIG. 8 shows a distribution of SiV$^-$ transition C wavelengths after annealing at 1100° C. The data are represented both as a kernel density estimation (blue curve) and a histogram (red boxes). The kernel density estimation is the same as that shown in FIG. 2.

Because the distributions in FIG. 2a have very different widths, these distributions are represented with kernel density estimations (KDEs). These KDEs generally give a better overall representation of the underlying distribution than histograms do. The bandwith of the gaussian kernel is set by the normal distribution approximation (Silverman's rule). The kernel density estimation features implemented, e.g., by the SmoothKernelDistribution and SmoothHistogram functions of Mathematica, can be used. A comparison of the kernel density estimation for transition C to histograms of the same data is shown in FIG. 8. The kernel density estimation for transition C closely follows the shape of the histogram.

It will be appreciated that while a particular sequence of steps has been shown and described for purposes of explanation, the sequence may be varied in certain respects, or the steps may be combined, while still obtaining the desired configuration. Additionally, modifications to the disclosed embodiment and claims are possible and within the scope of this disclosure.

The invention claimed is:

1. A structure comprising:
   a plurality of ion implanted, deterministically positioned optically active defects of negatively charged SiV⁻or GeV⁻centers, wherein each of the plurality of deterministically positioned optically active defects has a linewidth within a factor of one hundred of a lifetime limited linewidth of optical transitions of the plurality of deterministically positioned optically active defects, and
   wherein the plurality of deterministically positioned optically active defects has an inhomogeneous distribution of wavelengths, wherein at least half of the plurality of deterministically positioned optically active defects have transition wavelengths within a less than 8 nm range.

2. The structure of claim 1, comprising a diamond structure in which the plurality of deterministically positioned optically active defects are located.

3. The structure of claim 1, wherein the plurality of deterministically positioned optically active defects comprise a plurality of atom-vacancy centers.

4. The structure of claim 1, wherein the plurality of deterministically positioned optically active defects comprise a plurality of deterministically positioned SiV⁻centers.

5. The structure of claim 1, wherein the plurality of deterministically positioned optically active defects comprise a plurality of deterministically positioned GeV⁻centers.

6. The structure of claim 4, wherein the linewidths are within a factor of five of the lifetime limited linewidth of optical transitions of the plurality of deterministically positioned SiV⁻centers.

7. The structure of claim 5, wherein the linewidths are within a factor of five of the lifetime limited linewidth of optical transitions of the plurality of deterministically positioned GeV⁻centers.

8. The structure of claim 4, wherein a full-width at half-maximum of the plurality of deterministically positioned SiV⁻centers is in the range of 90 to 2500 MHz.

9. The structure of claim 4, wherein a full-width at half-maximum of the plurality of deterministically positioned SiV⁻centers is in the range of 150 to 870 MHz.

10. The structure of claim 4, wherein a full-width at half-maximum of the plurality of deterministically positioned SiV⁻centers is about 510 MHz.

11. The structure of claim 4, wherein a full-width at half-maximum of the plurality of deterministically positioned SiV⁻centers is in the range of 170 to 530 MHz.

12. The structure of claim 4, wherein a full-width at half-maximum of the plurality of deterministically positioned SiV⁻centers is about 350 MHz.

13. The structure of claim 5, wherein a full-width at half-maximum of the plurality of deterministically positioned GeV⁻centers is in the range of 30 to 2500 MHz.

14. The structure of claim 5, wherein a full-width at half-maximum of the plurality of deterministically positioned GeV⁻centers is in the range of 150 to 870 MHz.

15. The structure of claim 5, wherein a full-width at half-maximum of the plurality of deterministically positioned GeV⁻centers is about 510 MHz.

16. The structure of claim 5, wherein a full-width at half-maximum of the plurality of deterministically positioned GeV⁻centers is in the range of 170 to 530 MHz.

17. The structure of claim 5, wherein a full-width at half-maximum of the plurality of deterministically positioned GeV⁻centers is about 350 MHz.

18. The structure of claim 4, wherein at least half of the plurality of deterministically positioned SiV⁻centers have transition wavelengths within a 4 nm range.

19. The structure of claim 4, wherein at least half of the plurality of deterministically positioned SiV⁻centers have transition wavelengths within a 3 nm range.

20. The structure of claim 4, wherein at least half of the plurality of deterministically positioned SiV⁻centers have transition wavelengths within a 0.1 nm range.

21. The structure of claim 4, wherein at least half of the plurality of deterministically positioned SiV⁻centers have transition wavelengths within a 0.05 nm.

22. The structure of claim 4, wherein at least half of the plurality of deterministically positioned SiV⁻centers have transition wavelengths within a 0.03 nm range.

23. The structure of claim 5, wherein at least half of the plurality of deterministically positioned GeV⁻centers have transition wavelengths within a 4 nm range.

24. The structure of claim 5, wherein at least half of the plurality of deterministically positioned GeV⁻centers have transition wavelengths within a 3 nm range.

25. The structure of claim 5, wherein at least half of the plurality of deterministically positioned GeV⁻centers have transition wavelengths within a 0.1 nm range.

26. The structure of claim 5, wherein at least half of the plurality of deterministically positioned GeV⁻centers have transition wavelengths within a 0.05 nm.

27. The structure of claim 5, wherein at least half of the plurality of deterministically positioned GeV⁻centers have transition wavelengths within a 0.03 nm range.

28. A method of producing the structure of claim 1, the method comprising: defect the structure of claim 1, the method comprising:
   deterministically implanting at least one ion in a structure using a focused ion beam;
   heating the structure in a vacuum at a first temperature to create at least one optically active defect; and
   heating the structure in the vacuum at a second temperature to remove a plurality of other defects in the structure, wherein the second temperature is higher than the first temperature.

29. The method of claim 28, wherein the at least one optically active defect is at least one atom-vacancy center.

30. The method of claim 28, wherein the at least one optically active defect is an SiV⁻center.

31. The method of claim 28, wherein the at least one optically active defect is a GeV⁻center.

32. The method of claim 30, wherein the structure is diamond.

33. The method of claim 31, wherein the structure is diamond.

34. The method of claim 28, wherein the structure comprises a surface having less than 100 nm RMS roughness into which the at least one ion is implanted.

35. The method of claim 28, wherein the structure comprises a surface having less than 10 nm RMS roughness into which the at least one ion is implanted.

36. The method of claim 28, wherein the having less than 100 nm RMS roughness surface is produced through plasma etching.

37. The method of claim 28, wherein deterministically implanting at least one ion in a structure using a focused ion beam comprises at least one of determining a number of implanted ions, determining a depth of implantation of the at least one ion, or determining a location of implantation of the at least one ion.

38. The method of claim 28, wherein the pressure in the vacuum is less than $10^{-5}$ Torr.

39. The method of claim 28, wherein the first temperature is 600° C. to 1000° C.

40. The method of claim 28, wherein the first temperature is about 800° C.

41. The method of claim 28, wherein the second temperature is above 1000° C.

42. The method of claim 28, wherein the second temperature is above 1000° C. to 1600° C.

43. The method of claim 28, wherein the second temperature is about 1200° C.

44. The method of claim 28, wherein the structure comprises a previously fabricated device.

45. The method of claim 28, wherein the structure comprises at least one of an electrical device, an optical device, a micro-structured device, or a nano-structured device.

46. The method of claim 28, wherein the pressure in the vacuum is less in the range of $10^{-6}$ to $10^{-10}$ Torr.

47. The structure of claim 1, wherein the plurality of deterministically positioned optically active defects has an isotopic purity greater than a natural abundance of 92%.

48. The structure of claim 1, wherein the plurality of deterministically positioned optically active defects has an isotopic purity greater than a natural abundance of 37%.

* * * * *